(12) United States Patent
Spanke et al.

(10) Patent No.: US 11,534,274 B2
(45) Date of Patent: Dec. 27, 2022

(54) ADAPTER KIT FOR DENTAL MODEL ARTICULATORS

(71) Applicant: NATIONAL DENTEX, LLC, Palm Beach Gardens, FL (US)

(72) Inventors: Ryan A. Spanke, Reno, NV (US); Michael J. Mandeville, Reno, NV (US)

(73) Assignee: NATIONAL DENTEX, LLC, Jupiter, FL (US)

( * ) Notice: Subject to any disclaimer, the term of this patent is extended or adjusted under 35 U.S.C. 154(b) by 403 days.

(21) Appl. No.: 16/585,360

(22) Filed: Sep. 27, 2019

(65) Prior Publication Data
US 2020/0100878 A1    Apr. 2, 2020

Related U.S. Application Data

(60) Provisional application No. 62/739,422, filed on Oct. 1, 2018.

(51) Int. Cl.
*A61C 11/08*    (2006.01)
(52) U.S. Cl.
CPC .................................. *A61C 11/08* (2013.01)
(58) Field of Classification Search
CPC .............. A61C 11/08–088; A61C 11/085–088
See application file for complete search history.

(56) References Cited

U.S. PATENT DOCUMENTS

| | | | |
|---|---|---|---|
| 3,897,632 A | 8/1975 | Beu | |
| 5,749,725 A * | 5/1998 | Chinlund | A61C 11/08 433/60 |
| 5,967,776 A * | 10/1999 | Kim | A61C 11/08 433/54 |
| 6,582,931 B1 * | 6/2003 | Kois | A61C 19/05 33/513 |
| 7,273,372 B2 | 9/2007 | Suwa | |
| 8,419,425 B2 | 4/2013 | Hong | |
| 9,173,723 B2 | 11/2015 | Harrison | |
| 9,226,801 B2 | 1/2016 | Groscurth et al. | |
| 9,408,678 B2 | 8/2016 | Harrison | |
| 9,498,307 B2 | 11/2016 | Harrison | |
| 9,504,533 B2 | 11/2016 | Groscurth et al. | |
| 9,554,879 B2 | 1/2017 | Harrison | |

(Continued)

FOREIGN PATENT DOCUMENTS

DE    2922045 A  * 12/1980  ............. A61C 11/08

OTHER PUBLICATIONS

Machine translation of DE 2922045 (Year: 1980).*

*Primary Examiner* — Heidi M Eide
(74) *Attorney, Agent, or Firm* — Frost Brown Todd LLC

(57) ABSTRACT

An apparatus includes a dental model coupling portion and a base plate adapter coupling portion. The dental model coupling portion is configured to couple with a dental model. The base plate adapter coupling portion includes a body and a set of prongs extending from the body. The body is fixedly secured relative to the dental model coupling portion. The prongs are configured to removably secure the base plate adapter coupling portion to a base plate adapter of a dental model articulator. A base plate adapter includes a first side and a second side opposite the first side. The first side is configured to removably couple with the base plate adapter coupling portion. The second side is configured to removably couple with a dental model articulator.

18 Claims, 24 Drawing Sheets

(56) References Cited

U.S. PATENT DOCUMENTS

| | | |
|---|---|---|
| 2004/0131991 A1* | 7/2004 | Sasagawa .............. A61C 11/08 433/60 |
| 2007/0190480 A1* | 8/2007 | Gambacorta .......... A61C 11/08 433/60 |
| 2009/0298008 A1 | 12/2009 | Groscurth et al. |
| 2010/0124731 A1 | 5/2010 | Groscurth et al. |
| 2010/0151408 A1* | 6/2010 | Gramann ............. A61C 9/0006 433/37 |
| 2011/0045431 A1 | 2/2011 | Groscurth et al. |
| 2011/0045432 A1 | 2/2011 | Groscurth et al. |
| 2012/0164595 A1 | 6/2012 | Su |
| 2013/0309631 A1 | 11/2013 | Sugimoto |
| 2016/0106517 A1 | 4/2016 | Groscurth et al. |
| 2016/0324599 A1 | 11/2016 | Harrison |
| 2017/0071697 A1 | 3/2017 | Groscurth et al. |
| 2017/0112592 A1 | 4/2017 | Groscurth et al. |
| 2019/0336253 A1* | 11/2019 | Littlefair ................ A61C 11/08 |

* cited by examiner

ADAPTER KIT FOR DENTAL MODEL ARTICULATORS

PRIORITY

This application claims priority to U.S. Provisional Pat. App. No. 62/739,422, entitled "Adapter Kit for Dental Model Articulators," filed Oct. 1, 2018, the disclosure of which is incorporated by reference herein.

BACKGROUND

Dentures, crowns, bridges, and other dental appliances are made on a patient-specific basis, such that their construction is customized per patient. During the process of making such prosthetic dental appliances, it may be beneficial to register the bite of a patient. Such bite registration may record the occlusal positions and orientations of the maxillary teeth and the mandibular teeth. Once the bite registration has been acquired, a working model of the dental appliance may be mounted to a dental articulator device. The articulator device may be adjusted to simulate jaw movement of the patient with the dental appliance, to thereby achieve various occlusal positions with the working model of the dental appliance, to ensure that the configuration of the working model is appropriate for the patient at hand.

Examples of dental articulator devices are described in U.S. Pat. No. 3,897,632, entitled "Dental Articulator," issued Aug. 5, 1975, the disclosure of which is incorporated by reference herein; U.S. Pat. No. 7,273,372, entitled "Dental Articulator," issued Sep. 25, 2007, the disclosure of which is incorporated by reference herein; U.S. Pat. No. 8,419,425, entitled "Dental Model Articulator," issued Apr. 16, 2013, the disclosure of which is incorporated by reference herein; U.S. Pub. No. 2012/0164595, entitled "Articulator," published Jun. 28, 2012, the disclosure of which is incorporated by reference herein; and U.S. Pub. No. 2013/0309631, entitled "Jig for Bite Alignment In Dentistry and Bite Registration Method Using the Same," published Nov. 21, 2013, the disclosure of which is incorporated by reference herein.

Additional examples of dental articulators include the ARTEX® articulators by Amann Girrbach AG of Koblach, Austria; the PROTARevo™ articulator by KaVo Dental of Biberach, Germany; the Stratos articulators by Ivoclar Vivadent AG of Liechtenstein; the DENAR® Mark II articulator by Whip Mix of Louisville, Ky.; the PCH, PSH, and PCF articulators by Panadent Corporation of Colton, Calif.; and the SAM® articulators by SAM Präzisionstechnik GmbH of Munich, Germany.

While several dental articulator systems and methods have been made and used, it is believed that no one prior to the inventors has made or used the invention described in the appended claims.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The following description of certain examples of the invention should not be used to limit the scope of the present invention. The drawings, which are not necessarily to scale, depict selected embodiments and are not intended to limit the scope of the invention. The detailed description illustrates by way of example, not by way of limitation, the principles of the invention. Other examples, features, aspects, embodiments, and advantages of the invention will become apparent to those skilled in the art from the following description, which is by way of illustration, one of the best modes contemplated for carrying out the invention. As will be realized, the invention is capable of other different or equivalent aspects, all without departing from the invention. Accordingly, the drawings and descriptions should be regarded as illustrative in nature and not restrictive.

Any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those skilled in the art in view of the teachings herein. Such modifications and variations are intended to be included within the scope of the claims.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±10% of the recited value, e.g. "about 90%" may refer to the range of values from 81% to 99%. In addition, as used herein, the terms "patient," "host," "user," and "subject" refer to any human or animal subject and are not intended to limit the systems or methods to human use, although use of the subject invention in a human patient represents a preferred embodiment.

I. EXEMPLARY DENTAL ARTICULATOR DEVICE

Figure 1:
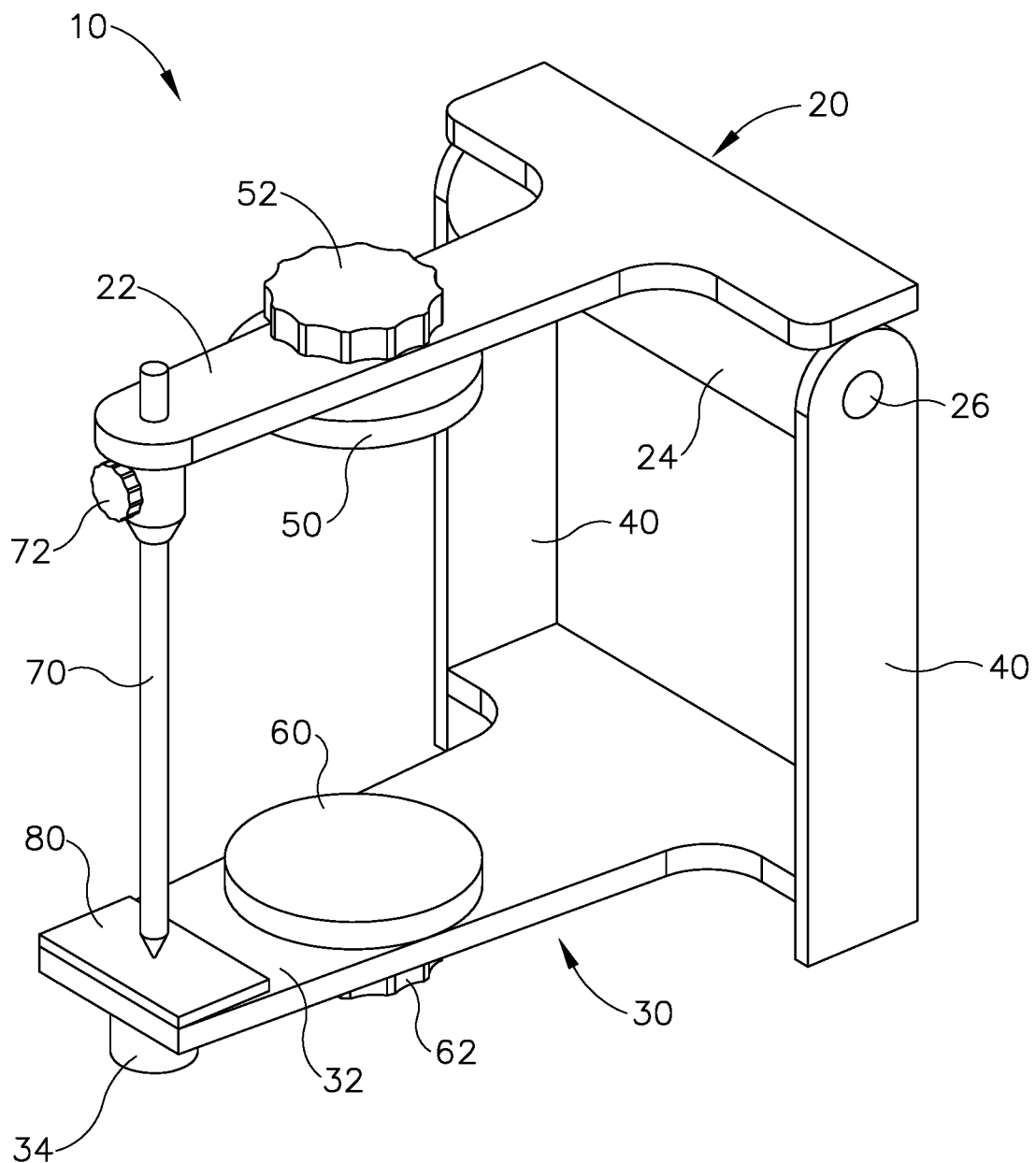
FIG. 1 depicts a perspective view of an exemplary dental articulator device in a first configuration.
Figure 2:
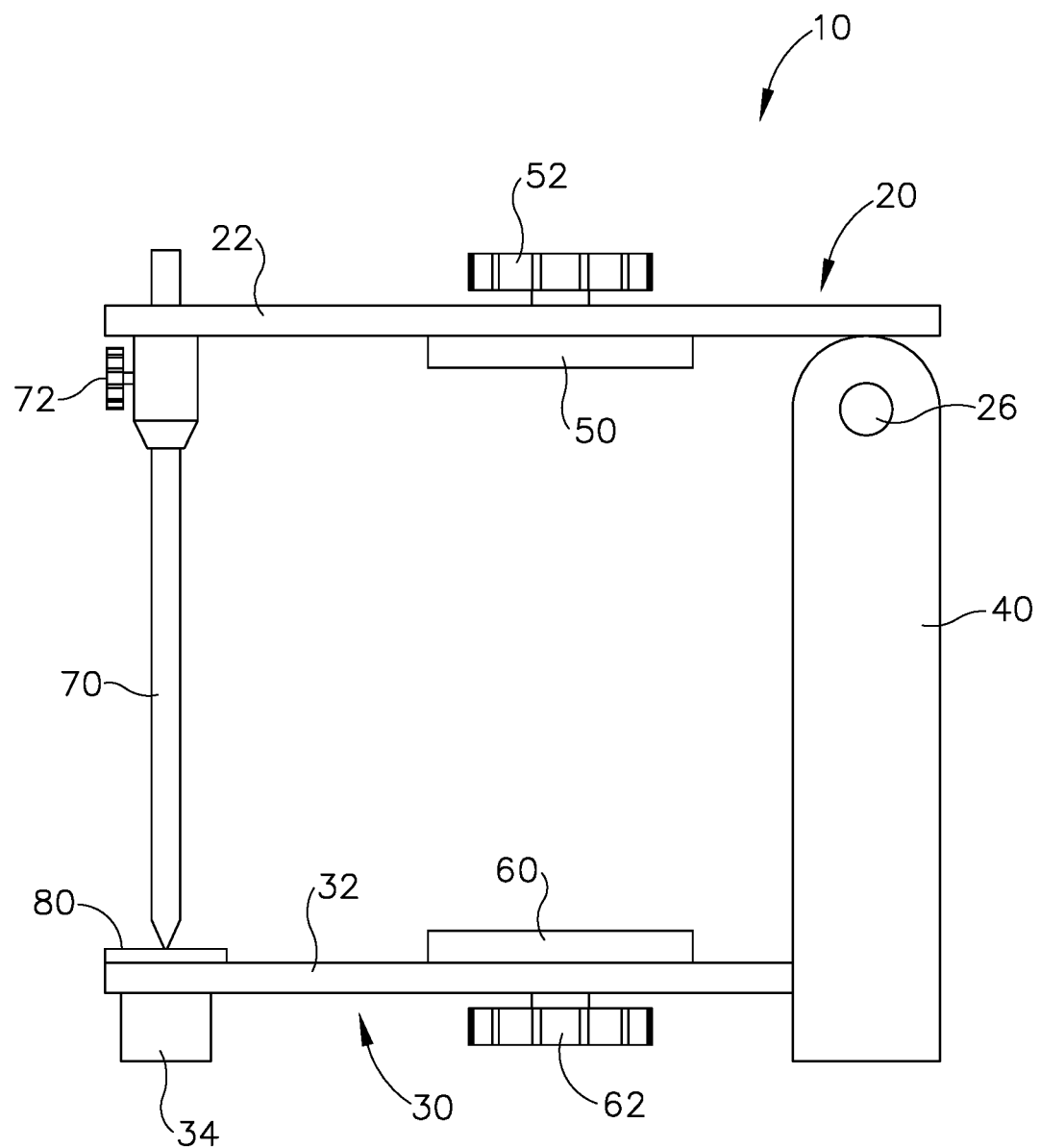
FIG. 2 depicts a side elevational view of the dental articulator device of FIG. 1 in the first configuration.
Figure 3:
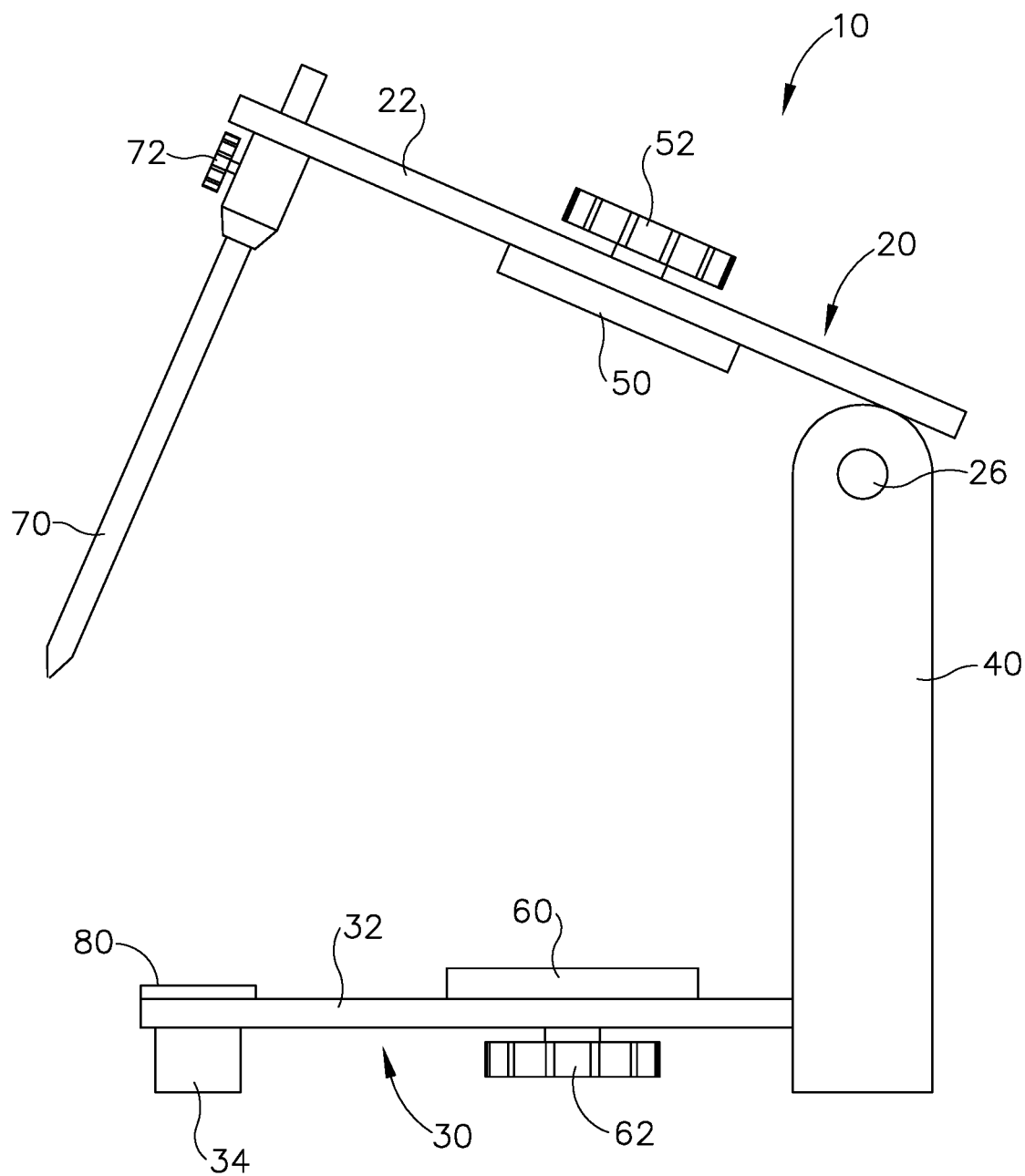
FIG. 3 depicts a side elevational view of the dental articulator device of FIG. 1 in a second configuration.
Figure 4:
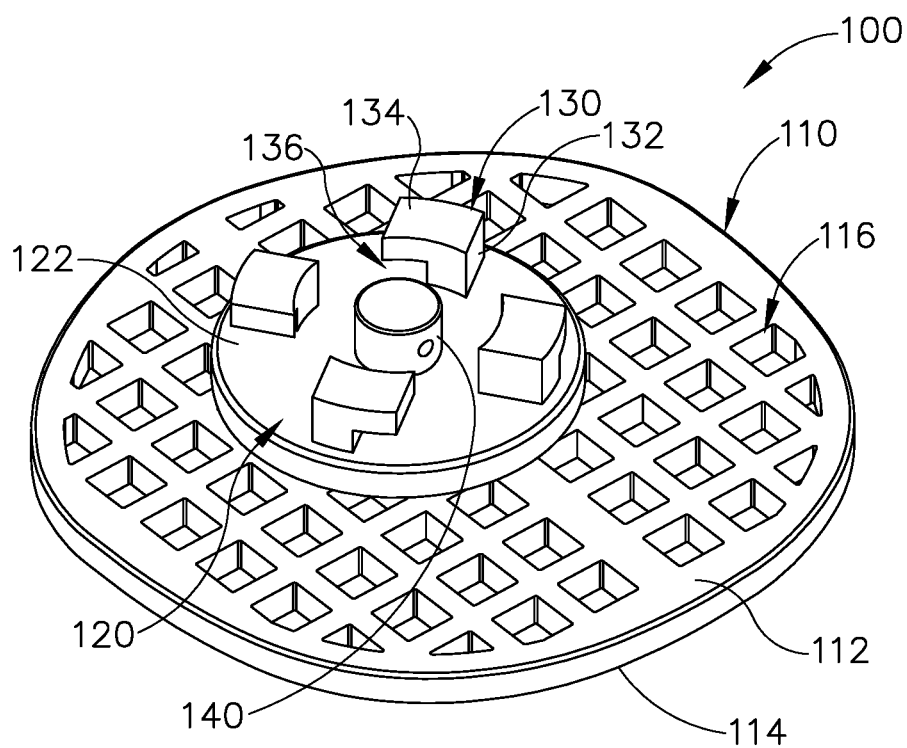
FIG. 4 depicts a first perspective view of an exemplary working model adapter.
Figure 5:
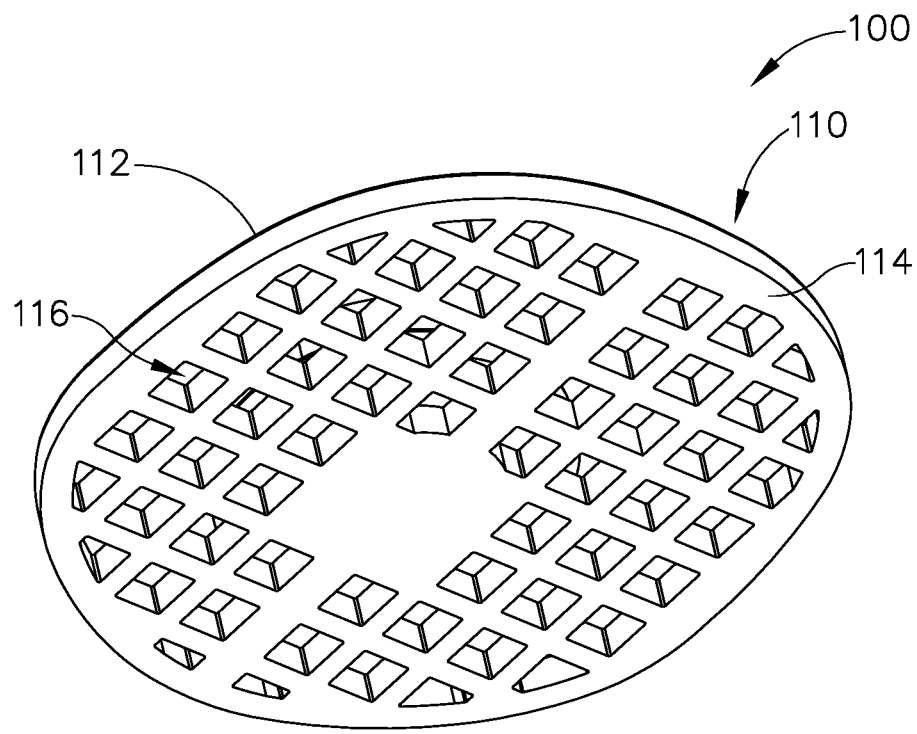
FIG. 5 depicts a second perspective view of the working model adapter of FIG. 4.
Figure 6:
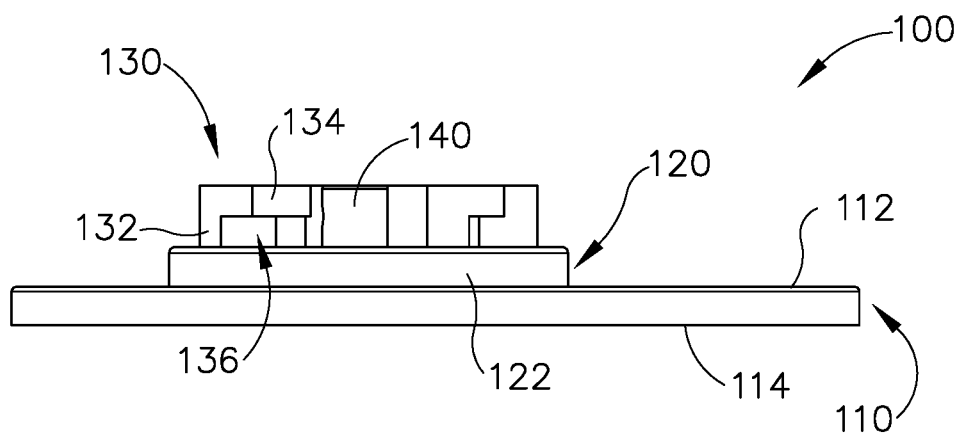
FIG. 6 depicts a side elevational view of the working model adapter of FIG. 4.
Figure 7:
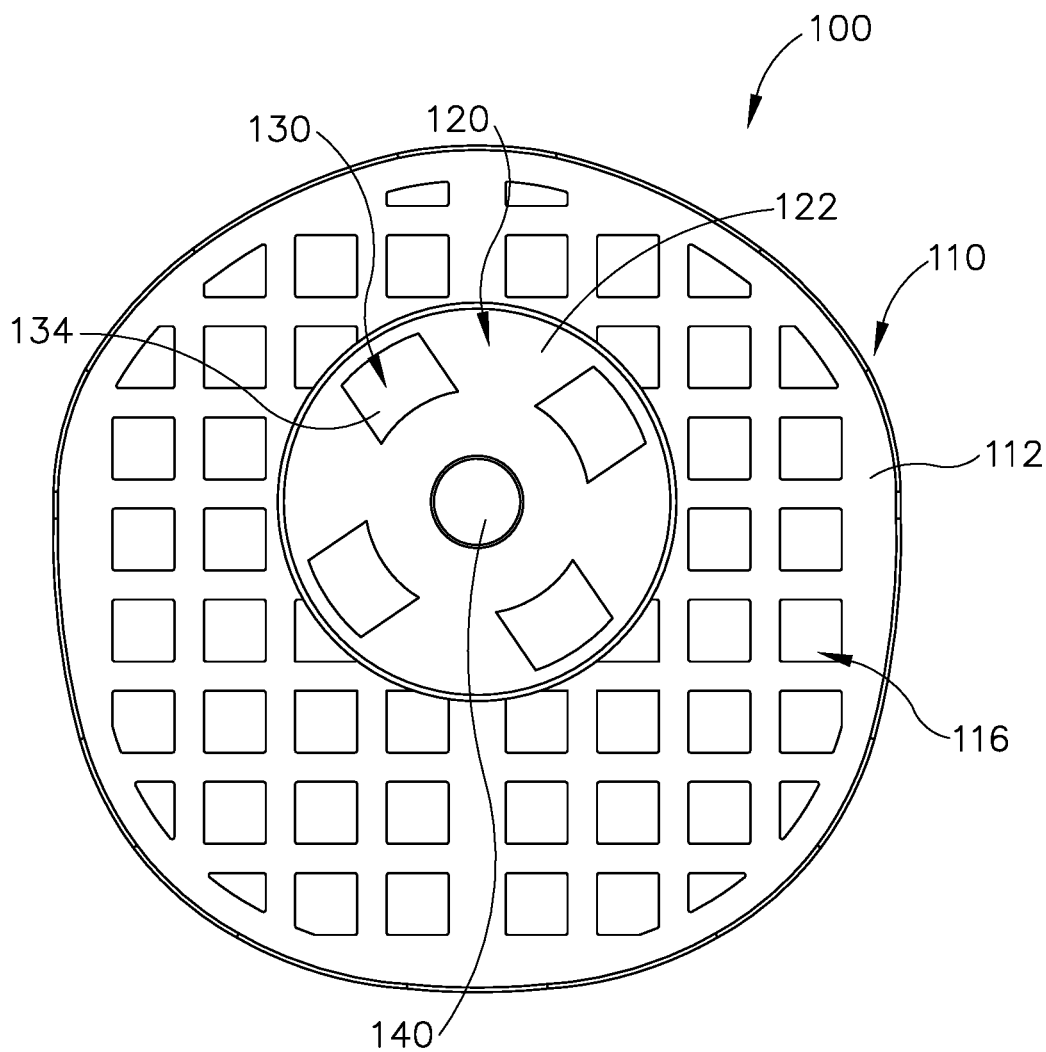
FIG. 7 depicts a first plan view of the working model adapter of FIG. 4.
Figure 8:
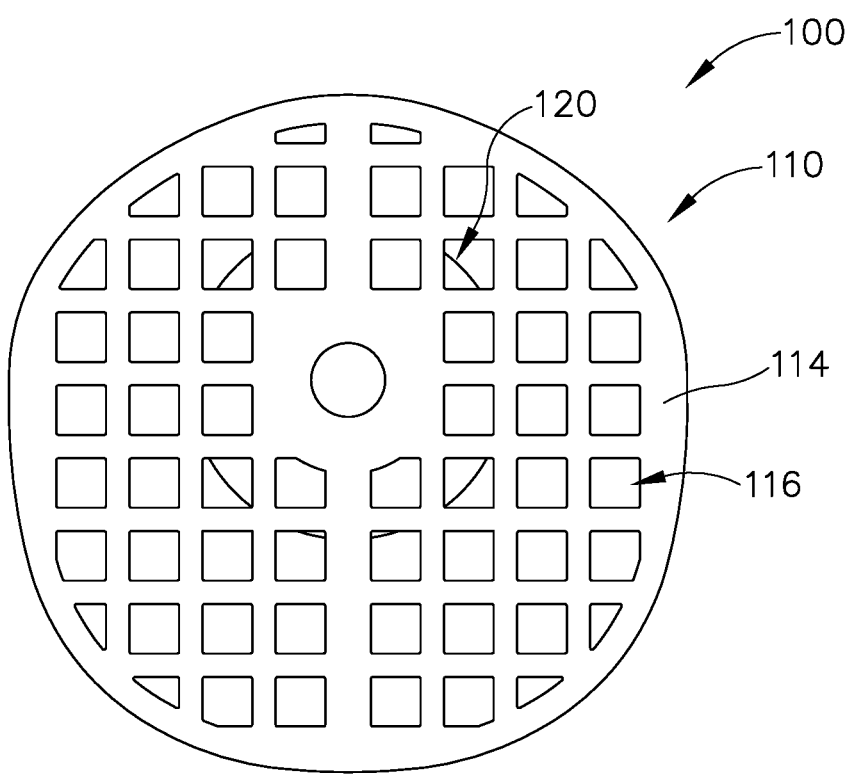
FIG. 8 depicts a second view of the working model adapter of FIG. 4.

FIGS. 1-3 show an exemplary articulator device (10). Articulator device (10) includes an upper portion (20) and a lower portion (30). Upper portion (20) includes distally projecting arm (22) and a support member (24). An upper base plate (50) is secured to arm (22). Upper base plate (50) is configured to couple with a model (e.g., cast) of a patient's maxillary dentition or a model of a maxillary dental prosthetic, as will described in greater detail below. Upper base plate (50) may include a magnet or other features to selectively secure a maxillary dental model (e.g., of a patient's maxillary dentition or a maxillary dental prosthetic) to upper base plate (50). Upper base plate (50) may also include recesses, protrusions, or other structural features to ensure proper angular alignment of the maxillary dental model to upper base plate (50). An upper knob (52) is coupled with upper base plate (50) and is operable to adjust the vertical position of upper base plate (50) relative to arm (22).

Lower portion (30) includes a distally projecting arm (30) and a distal foot (34). A lower base plate (60) is secured to arm (32). Lower base plate (60) is configured to couple with a mandibular dental cast or a model of a mandibular dental prosthetic, as will described in greater detail below. Lower base plate (60) may include a magnet or other features to selectively secure a mandibular dental model (e.g., of a patient's mandibular dentition or a mandibular dental prosthetic) to lower base plate (60). Lower base plate (60) may also include recesses, protrusions, or other structural features to ensure proper angular alignment of the mandibular dental model relative to lower base plate (60). A lower knob (62) is coupled with lower base plate (60) and is operable to adjust the vertical position of lower base plate (60) relative to arm (32). In the present example, the structural configuration of mounting features of lower base plate (60) is identical to the structural configuration of mounting features of upper base plate (50).

A pin (70) is slidably coupled with arm (22). A knob (72) is operable to selectively lock the vertical position of pin (70) relative to arm (22). The operator may thus loosen knob (72) to enable pin (70) to slide vertically relative to arm (22); then tighten knob (72) to lock the lock the vertical position of pin (70) relative to arm (22) after achieving the desired vertical position of pin (70). A pad (80) is positioned at the distal end of arm (32) and is positioned to contact the lower tip of pin (70) when articulator device (10) is in the closed configuration shown in FIGS. 1-2.

A pair of upright members (40) extend between portions (20, 30) and couple portions (20, 30) together. In particular, pins (26) at the ends of support member (24) pivotably couple upper portion (20) with upright members (40); while the proximal end of lower portion (30) is fixedly secured to upright members (40). Upper portion (20) may thus pivot relative to lower portion (30) between a first position (FIG. 2) and a second position (FIG. 3). In the present example, this pivotal motion is along a single, fixed axis. In other versions, the pivot axis is not fixed, such that the pivot axis moves along a curve or other path as upper portion (20) transitions between the first position and other positions. In addition, articulator device (10) may enable upper portion (20) to move laterally relative to lower portion (30). Various other kinds of movement that may be permitted of upper portion (20) relative to lower portion (30) will be apparent to those skilled in the art in view of the teachings herein, including various movements associated with normal jaw movement in human patients.

Those skilled in the art will recognize that dental models (e.g., casts of a patient's dentition, models of dental prosthetics, etc.) may be mounted to corresponding base plates (50, 60). In some cases, one base plate (50, 60) may receive a model of a patient's actual dentition while the other base plate (50, 60) may receive a model of a dental prosthetic. In some other cases, upper base plate (50) may receive a model of a maxillary dental prosthetic while lower base plate (60) may receive a model of a mandibular dental prosthetic. In any such cases, the operator may pivotally and/or laterally move upper portion (20) relative to lower portion (30) to simulate patient jaw movement, to thereby test occlusal activity between the dental models, to thereby ensure that a model of a dental prosthetic is appropriately configured before the final dental prosthetic is installed in the patient's mouth.

Those skilled in the art will also recognize that numerous variations of articulator device (10) exist; and that such variations have numerous different features and operabilities. Articulator device (10) described above is just one merely illustrative example provided for purposes of context only. The teachings below may be readily used in conjunction with various other kinds of articulator devices (10).

II. EXEMPLARY WORKING MODEL ADAPTERS

As noted above, articulator devices (10) in the marketplace may vary substantially in their features, configurations, and operabilities. Such variation may include the structural configurations of base plates (50, 60) and the vertical spacing between base plates (50, 60). Such variation may make it relatively difficult to transfer one dental model from one version of an articulator device (10) to another version of an articulator device (10) using conventional equipment. While a mount for a given dental model may readily couple with a base plate (50, 60) of one particular kind of articulator device (10), the same mount may not be configured to appropriately couple with a base plate (50, 60) of another kind of articulator device (10). It may therefore be desirable to provide an adapter system that enables a single dental model to readily couple with various kinds of base plates (50, 60) of various kinds of articulator devices (10). Such an adapter system may include one adapter component that is fixedly secured to the dental model; and a complementary adapter component that couples with a base plate (50, 60). An example of such an adapter system is described in greater detail below.

As used herein, the term "dental model" shall be read to include models of a patient's actual dentition and models of dental prosthetics. Such models may include teeth, gums, and other anatomical structures adjacent to the teeth as will be apparent to those skilled in the art in view of the teachings herein. It should also be understood that such models may be formed in various ways, including but not limited to casting (e.g., plaster casting, etc.) and additive manufacturing (e.g., 3D printing, etc.). Various suitable forms that dental models may take, and various ways in which such models may be constructed, will be apparent to those skilled in the art in view of the teachings herein.

A. Exemplary Dental Model Adapter Plate Assembly

FIGS. 4-9 show an exemplary dental model adapter (100) that may be used as part of an adapter system to provide compatibility with various kinds of base plates (50, 60) of various kinds of articulator devices (10). Dental model adapter (100) of this example includes a plate portion (110) and a coupling portion (120), with portions (110, 120) being fixedly secured together. Plate portion (110) includes a first side (112) and a second side (114). A plurality of openings (116) extend between sides (112, 114), such that plate portion (110) defines a grid configuration. While openings (116) are square in the present example, openings (116) may have any other suitable shape or combination of shapes.

Coupling portion (120) is positioned on first side (112) of plate portion (110). Coupling portion (120) of the present example includes a disc-shaped body (122), an array of bayonet prongs (130) projecting from body (122), and a centering pin (140) projecting from body (122). Each bayonet prong (130) includes a vertically projecting portion (132) and a laterally projecting portion (134). Each laterally projecting portion (134) defines a corresponding gap (136) with body (122). In some versions, each laterally projecting portion (134) includes a detent feature on the side of laterally projecting portion (134) facing gap (136). By way of example only, this detent feature may include a rounded protrusion, a rounded recess, a tab, or some other kind of detent feature that is configured to engage with a complementary detent feature of another component as will be described in greater detail below. Various suitable forms that such detent features may take will be apparent to those skilled in the art in view of the teachings herein.

Bayonet prongs (130) are equiangularly spaced from each other in a generally annular array in the present example, though it should be understood that any other suitable spacing may be used. Similarly, while four bayonet prongs (130) are provided in the present example, any other suitable number of bayonet prongs (130) may be provided. Centering pin (140) is coaxially centered about the central axis of body (122); and about the central axis of the annular array of bayonet prongs (130). Alternatively, centering pin (140) may be located at any other suitable position.

Figure 9:
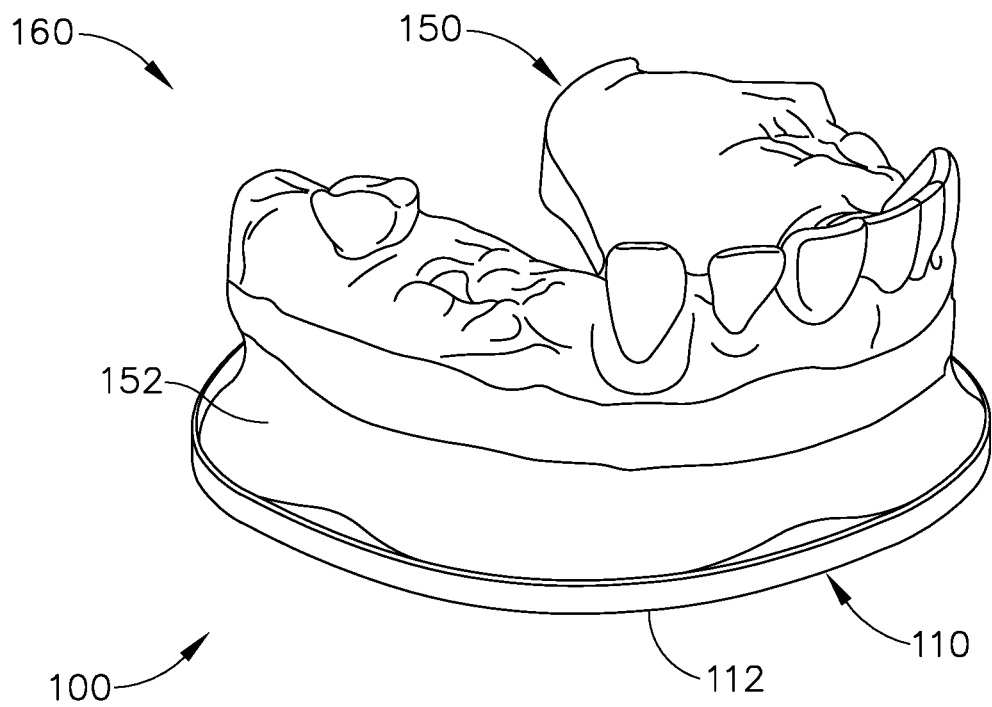
FIG. 9 depicts a perspective view of the working model adapter of FIG. 4, with a working model mounted to the plate of the adapter.
Figure 10:
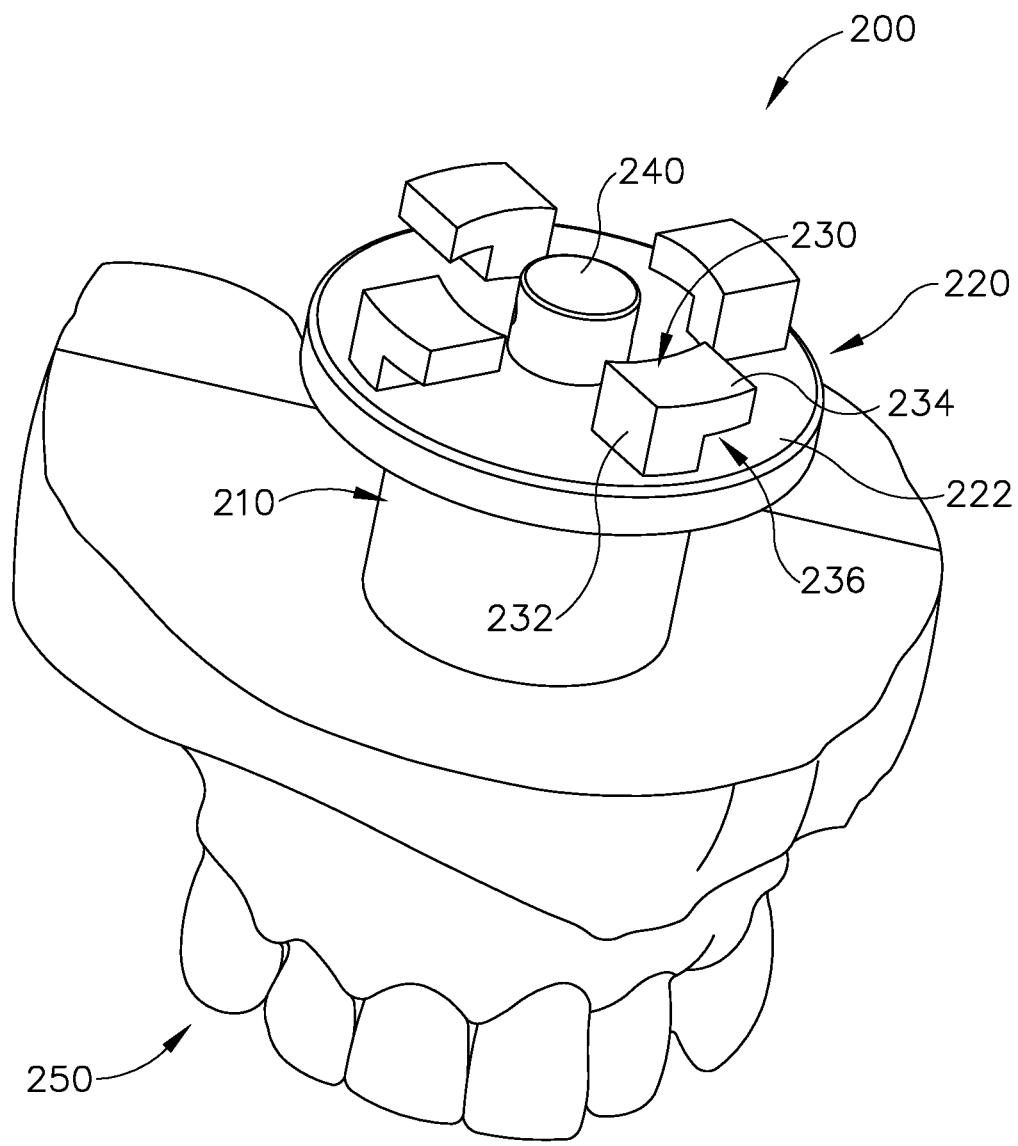
FIG. 10 depicts a first perspective view of a working model with an exemplary integral adapter.
Figure 11:
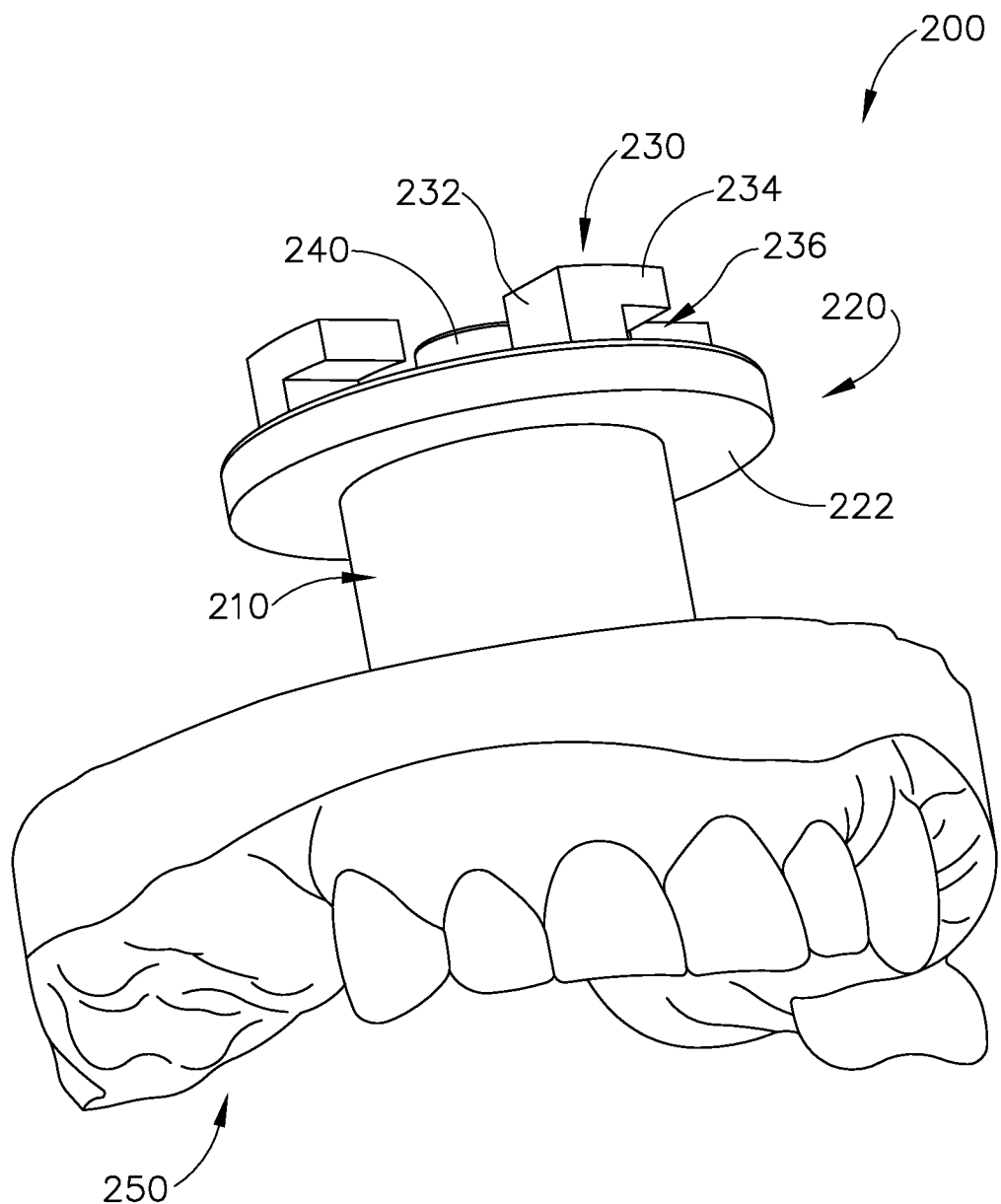
FIG. 11 depicts a second perspective view of the working model with integral adapter of FIG. 10.
Figure 12:
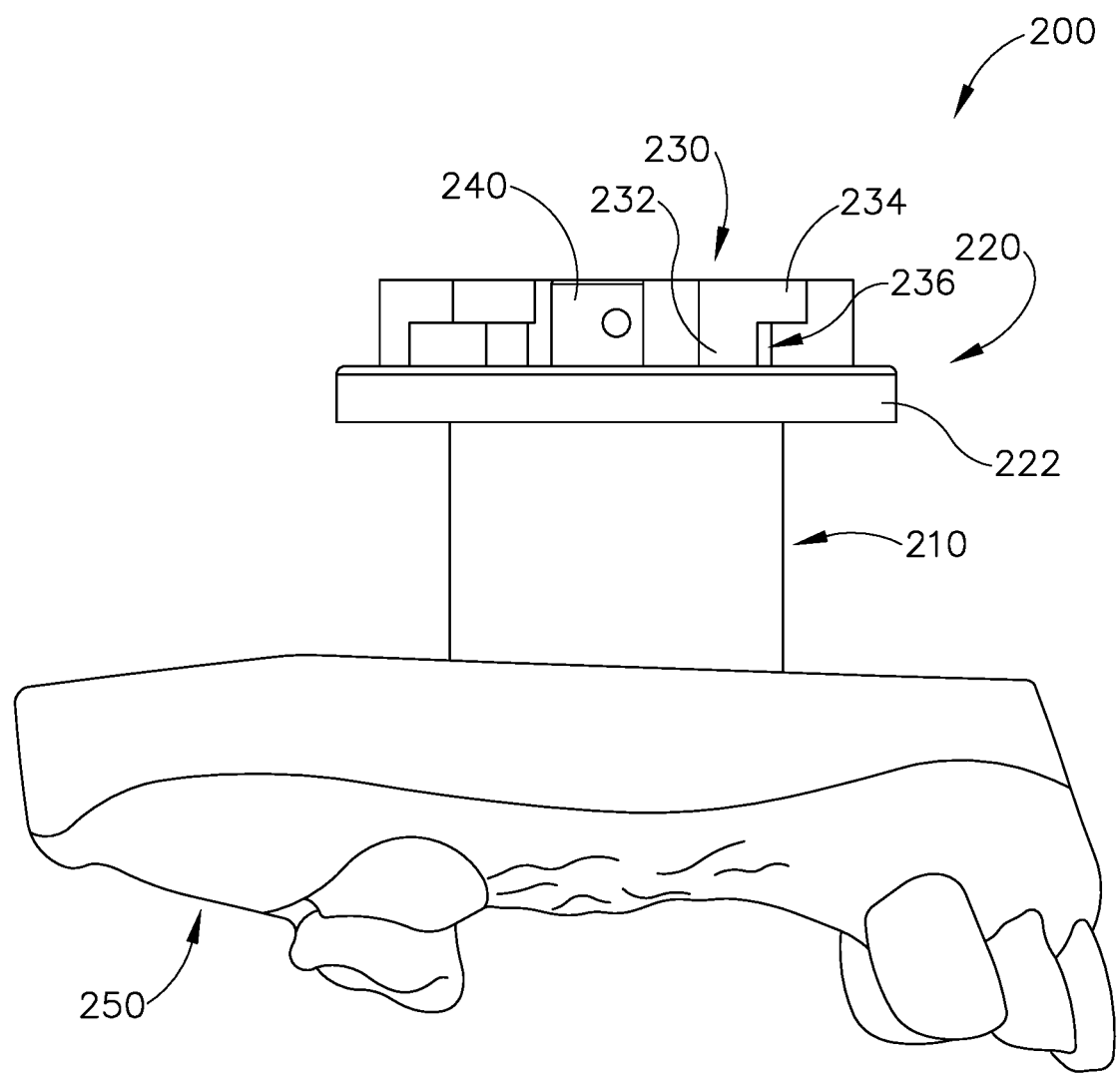
FIG. 12 depicts a side elevational view of the working model with integral adapter of FIG. 10.
Figure 13:
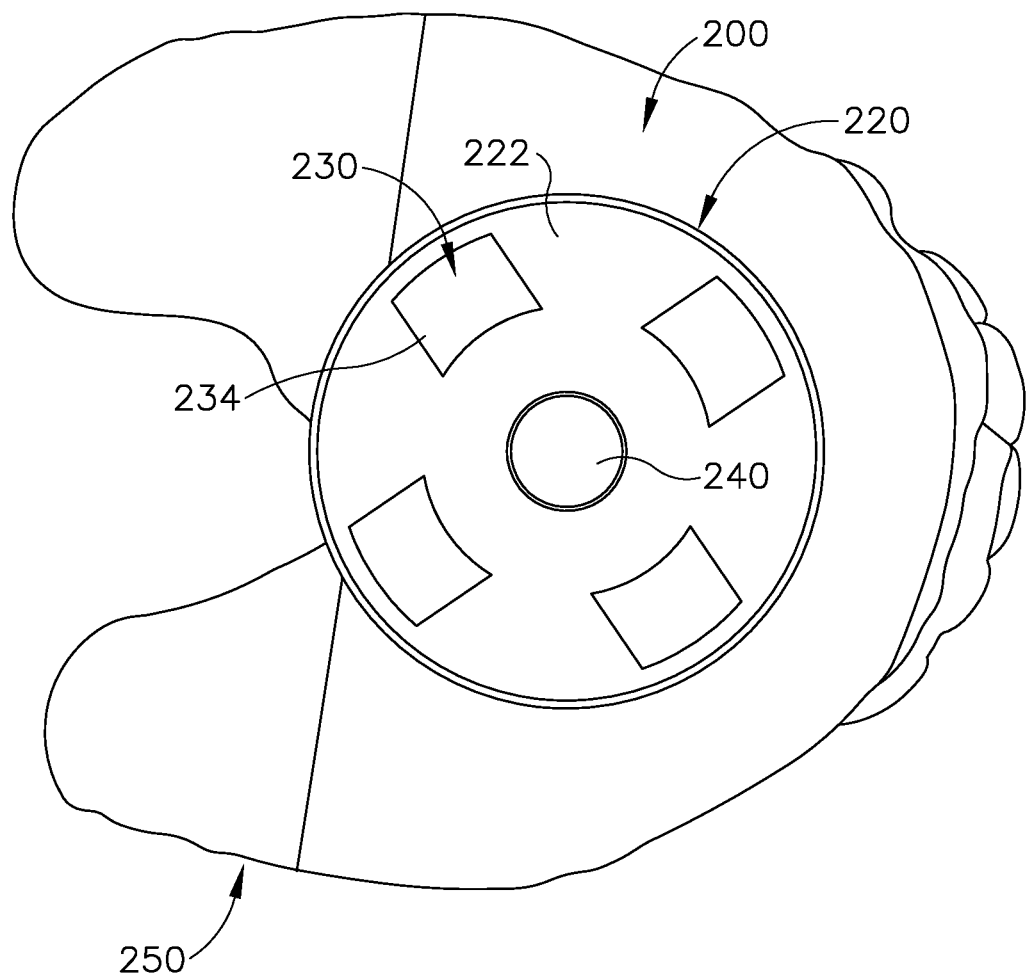
FIG. 13 depicts a plan view of the working model with integral adapter of FIG. 10.
Figure 14:
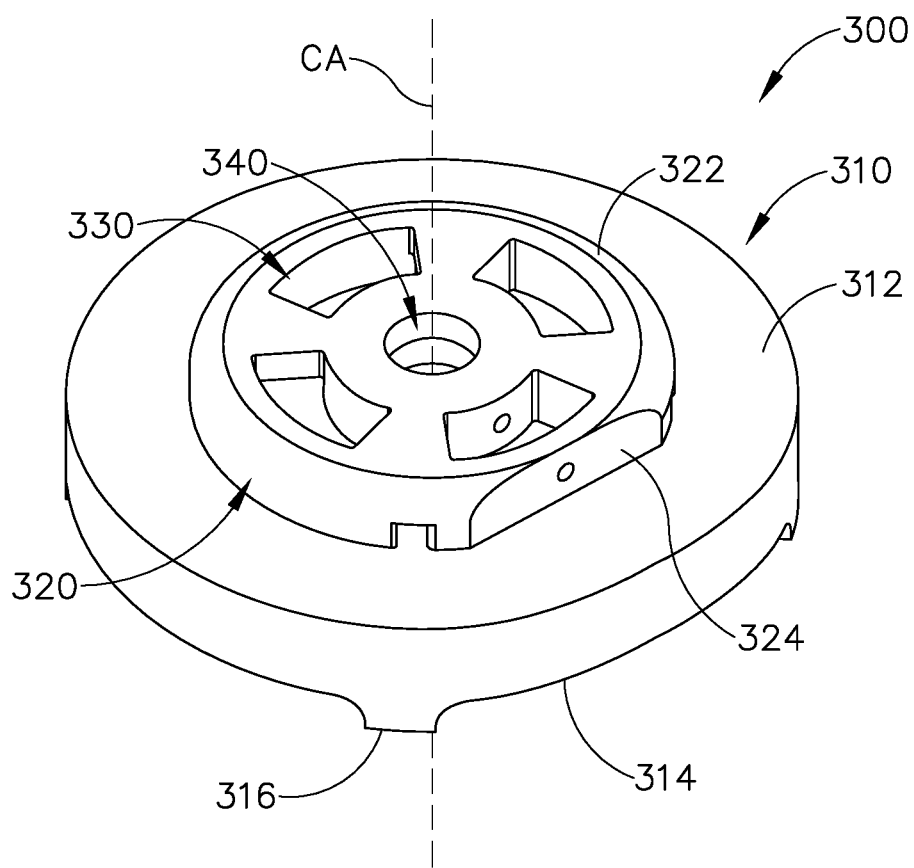
FIG. 14 depicts a first perspective view of an exemplary base plate adapter.

As shown in FIG. 9, dental model adapter (100) is configured to fixedly couple with a dental model (150). In particular, plaster (152) of dental model (150) is configured to secure dental model (150) to dental model adapter (100) via plate portion (110). By way of example only, plaster (152) may enter at least some of openings (116) to provide a secure coupling between dental model (150) and dental model adapter (100). In some instances, such plaster (152) is the same plaster that is used to form dental model adapter (100). In some such instances, dental model (150) is formed directly on top of dental model adapter (100), and the wet plaster (152) enters openings (116) while dental model is being formed (150). In some other instances, dental model (150) is formed separately, and plaster (152) is subsequently used to secure dental model (150) to dental model adapter (100). As yet another merely illustrative alternative, an adhesive, epoxy, other material(s), or other structure(s) may be used to secure dental model (150) to dental model adapter (100).

Regardless of how dental model (150) is secured to dental model adapter (100), in the present example, the bond between dental model (150) and model adapter (100) is rigid and secure such that dental model (150) and model adapter (100) together effectively form a single, monolithic unit (160) or assembly. An example of how this unit (160) may be removably coupled with various base plate adapters (300, 400, 500, 600) will be described in greater detail below.

B. Exemplary Dental Model with Integral Adapter

FIGS. 10-13 show another variation where a single, monolithic unit (200) or assembly is formed by post (210), a coupling portion (220), and a dental model (250). By way of example only, post (210), coupling portion (220), and dental model (250) may all be formed together, simultaneously and unitarily, in a molding process. As another merely illustrative example, post (210), coupling portion (220), and dental model (250) may all be formed together, simultaneously and unitarily, in a rapid prototyping process (e.g., 3D printing, etc.). Other suitable ways in which unit (200) may be formed will be apparent to those skilled in the art in view of the teachings herein.

Post (210) extends from coupling portion (220) to dental model (250) and thereby unitarily couples coupling portion (220) with dental model (250). While post (210) is cylindraceous in the present example, post (210) may have any other suitable configuration. Coupling portion (220) of the present example includes a disc-shaped body (222), an array of bayonet prongs (230) projecting from body (222), and a centering pin (240) projecting from body (222). Each bayonet prong (230) includes a vertically projecting portion (232) and a laterally projecting portion (234). Each laterally projecting portion (234) defines a corresponding gap (236) with body (222). In some versions, each laterally projecting portion (234) includes a detent feature on the side of laterally projecting portion (234) facing gap (236). By way of example only, this detent feature may include a rounded protrusion, a rounded recess, a tab, or some other kind of detent feature that is configured to engage with a complementary detent feature of another component as will be described in greater detail below. Various suitable forms that such detent features may take will be apparent to those skilled in the art in view of the teachings herein.

Bayonet prongs (230) are equiangularly spaced from each other in a generally annular array in the present example, though it should be understood that any other suitable spacing may be used. Similarly, while four bayonet prongs (230) are provided in the present example, any other suitable number of bayonet prongs (230) may be provided. Centering pin (240) is coaxially centered about the central axis of body (222); and about the central axis of the annular array of bayonet prongs (230). Alternatively, centering pin (240) may be located at any other suitable position.

An example of how unit (200) may be removably coupled with various base plate adapters (300, 400, 500, 600) will be described in greater detail below.

III. EXEMPLARY BASE PLATE ADAPTERS

Again as noted above, articulator devices (10) in the marketplace may vary substantially in the structural configurations of base plates (50, 60). This may include variation in the shape of base plate (50, 60); variation in the thickness of base plate (50, 60); variation in the position, size, and arrangement of recesses, ridges, and other features of base plate (50, 60) that mate with mounts of dental models; and other variations. It may therefore be desirable to provide adapters for various kinds of base plates (50, 60) that enable base plates (50, 60) to be coupled with a universal mounting structure for dental models.

The following describes various base plate adapters (300, 400, 500, 600) that may be coupled with various different kinds of base plates (50, 60). Each base plate adapter (300, 400, 500, 600) provides a structure that mates with a universal mounting structure for dental models. In this case, the universal mounting structure is coupling portion (120, 220). With cooperation between coupling portion (120, 220) and complementary structures of base plate adapters (300, 400, 500, 600), dental models (150, 250) may be readily coupled with various different kinds of base plates (50, 60), thereby enabling dental models (150, 250) to be readily mounted to various different kinds of articulator devices (10). In some instances, a kit may include several base plate adapters (300, 400, 500, 600), allowing an operator to select the base plate adapter (300, 400, 500, 600) that corresponds to a particular articulator device (10) at hand. The operator may then mount the selected base plate adapters (300, 400, 500, 600) to the base plates (50, 60) of the articulator device (10); then couple the models (150, 250) to the corresponding base plate adapters (300, 400, 500, 600) via coupling portion (120, 220).

A. First Exemplary Base Plate Adapter

Figure 15:
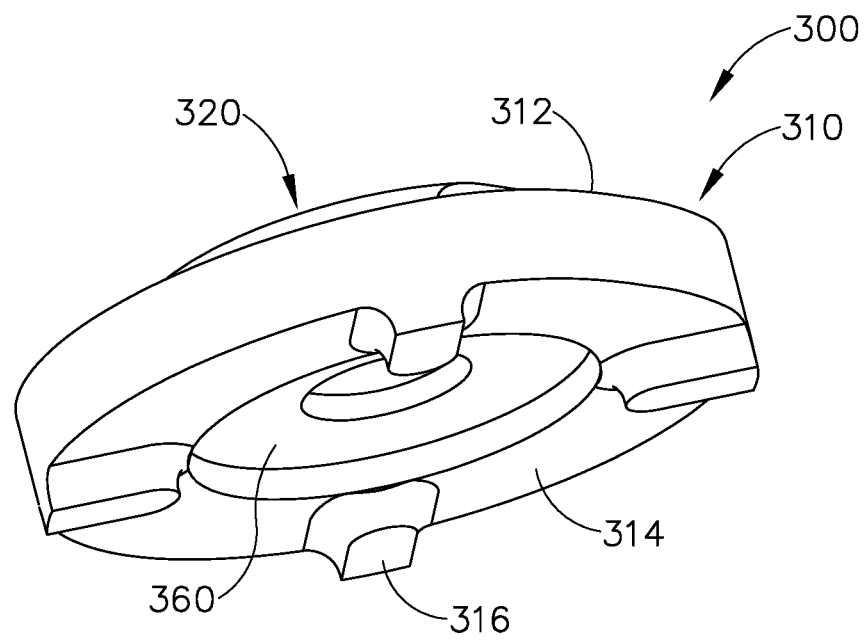
FIG. 15 depicts a second perspective view of the base plate adapter of FIG. 14.
Figure 16:
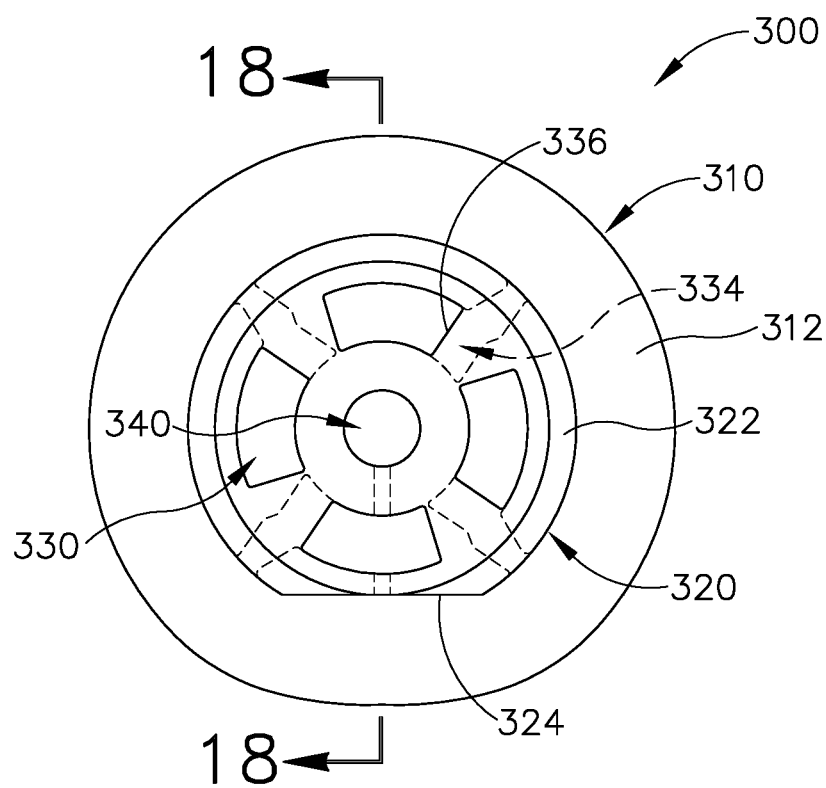
FIG. 16 depicts a first plan view of the base plate adapter of FIG. 14.
Figure 17:
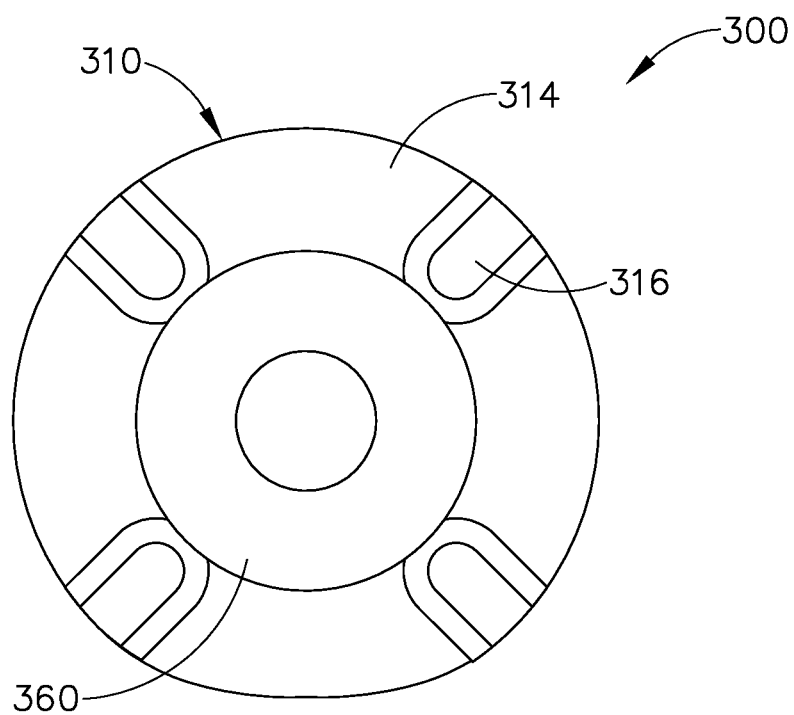
FIG. 17 depicts a second plan view of the base plate adapter of FIG. 14.
Figure 18:
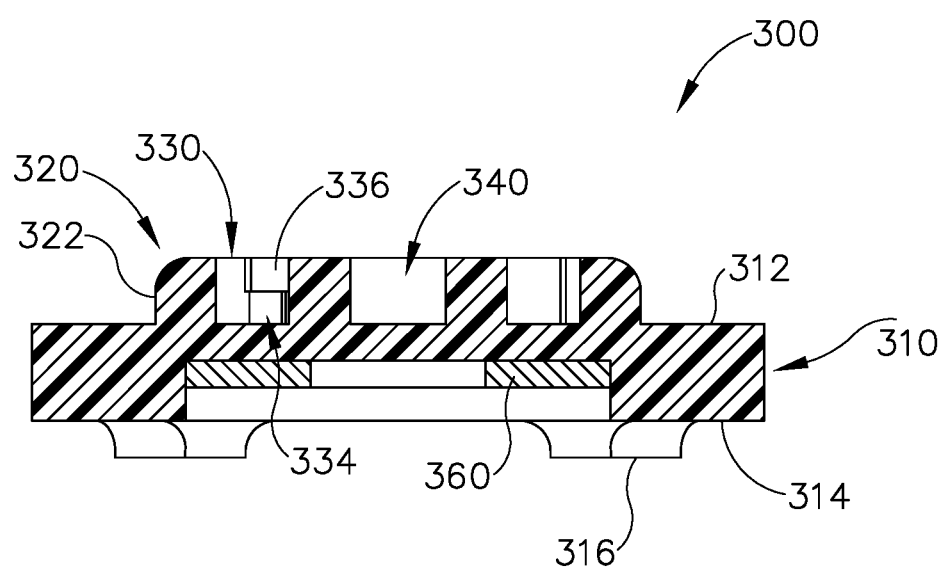
FIG. 18 depicts a cross-sectional view of the base plate adapter of FIG. 14, the cross-section taken along line 18-18 of FIG. 16.

FIGS. 14-18 show one example of a base plate adapter (300) that may be removably coupled with a selected base plate (50, 60). As noted above, the base plates (50, 60) of a given articulator device (10) may be configured identically to each other, such that base plate adapter (300) may be selectively coupled with either upper base plate (50) or lower base plate (60). Base plate adapter (300) of this example includes a base portion (310) and a coupling portion (320). Base portion (310) is generally circular in this example, with a central axis (CA) passing through the center of the circular shape formed by base portion (310). Base portion (310) includes a first side (312) and a second side (314). As best seen in FIGS. 15 and 17-18, a set of protrusions (316) extend from second side (314). Protrusions (316) are equiangularly spaced apart from each other and extend along respective radial paths from the central axis (CA). While four protrusions (316) are shown, any other suitable number of protrusions (316) may be provided in any other arrangement.

In this example, the size, spacing, and other configurational aspects of protrusions (316) are configured to complement recesses of base plates (50, 60) of a first particular kind of articulator device (10). Protrusions (316) thus ensure that base plate adapter (300) will seat properly on a selected base plate (50, 60) of the first particular kind of articulator device (10), including being oriented at an appropriate angular position on the selected base plate (50, 60).

As shown in FIGS. 15 and 17-18, an annular member (360) is also incorporated into base plate adapter (300), adjacent to second side (314). In some versions, annular member (360) is formed of ferrous material, such as steel. In such versions, annular member (360) may cooperate with a magnet that is integrated into base plate (50, 60), to thereby enable base plate adapter (300) to be removably secured to base plate (50, 60) through magnetic attraction. In some other versions, annular member (360) is itself magnetic. In some such versions, base plate (50, 60) includes a ferrous material, but not necessarily a magnet, to enable base plate adapter (300) to be removably secured to base plate (50, 60) through magnetic attraction.

Coupling portion (320) is positioned on first side (312) of base portion (310). Coupling portion (320) of the present example includes a disc-shaped body (322), an array of bayonet recesses (330) formed in body (322), and a centering pin recess (340) formed in body (322). Body (322) is centered on central axis (CA) of base portion (310) in this example. Body (322) also includes a chordal cutout (324), thereby providing a laterally flat region along body (322). As best seen in FIGS. 16 and 18, each bayonet recess (330) includes a circumferentially extending portion (334) positioned under a shelf portion (336). As described below, each circumferentially extending portion (334) is sized and configured to receive a corresponding laterally projecting portion (134, 234) of bayonet prong (130, 230), with each shelf portion (336) being received in a corresponding gap (136, 236) of bayonet prong (130, 230). In some versions, shelf portion (336) includes a detent feature on the side of shelf portion (336) facing circumferentially extending portion (334) of bayonet recess (330). Such a detent feature may be configured to complement the detent feature of laterally projecting portion (134, 234) described above, such that the detent features may cooperate to selectively secure dental model adapter (100, 200) with base plate adapter (300). The detent feature of shelf portion (336) may take the form of a rounded protrusion, a rounded recess, a tab, or some other kind of detent feature as will be apparent to those skilled in the art in view of the teachings herein.

Bayonet recesses (330) are equiangularly spaced from each other in a generally annular array in the present example, though it should be understood that any other suitable spacing may be used. Similarly, while four bayonet recesses (330) are provided in the present example, any other suitable number of bayonet recesses (330) may be provided. In the present example, any variation in the configuration and arrangement of bayonet recesses (330)

should correspond with variations in the configuration and arrangement of bayonet prongs (130, 230).

Centering pin recess (340) is coaxially centered about the central axis of body (322); about the central axis of the annular array of bayonet recesses (330); and about the central axis (CA) of base portion (310). Alternatively, centering pin recess (340) may be located at any other suitable position. In the present example, any variation in the configuration and positioning of centering pin recess (340) should correspond with variations in the configuration and arrangement of centering pin (140, 240).

Figure 19A:
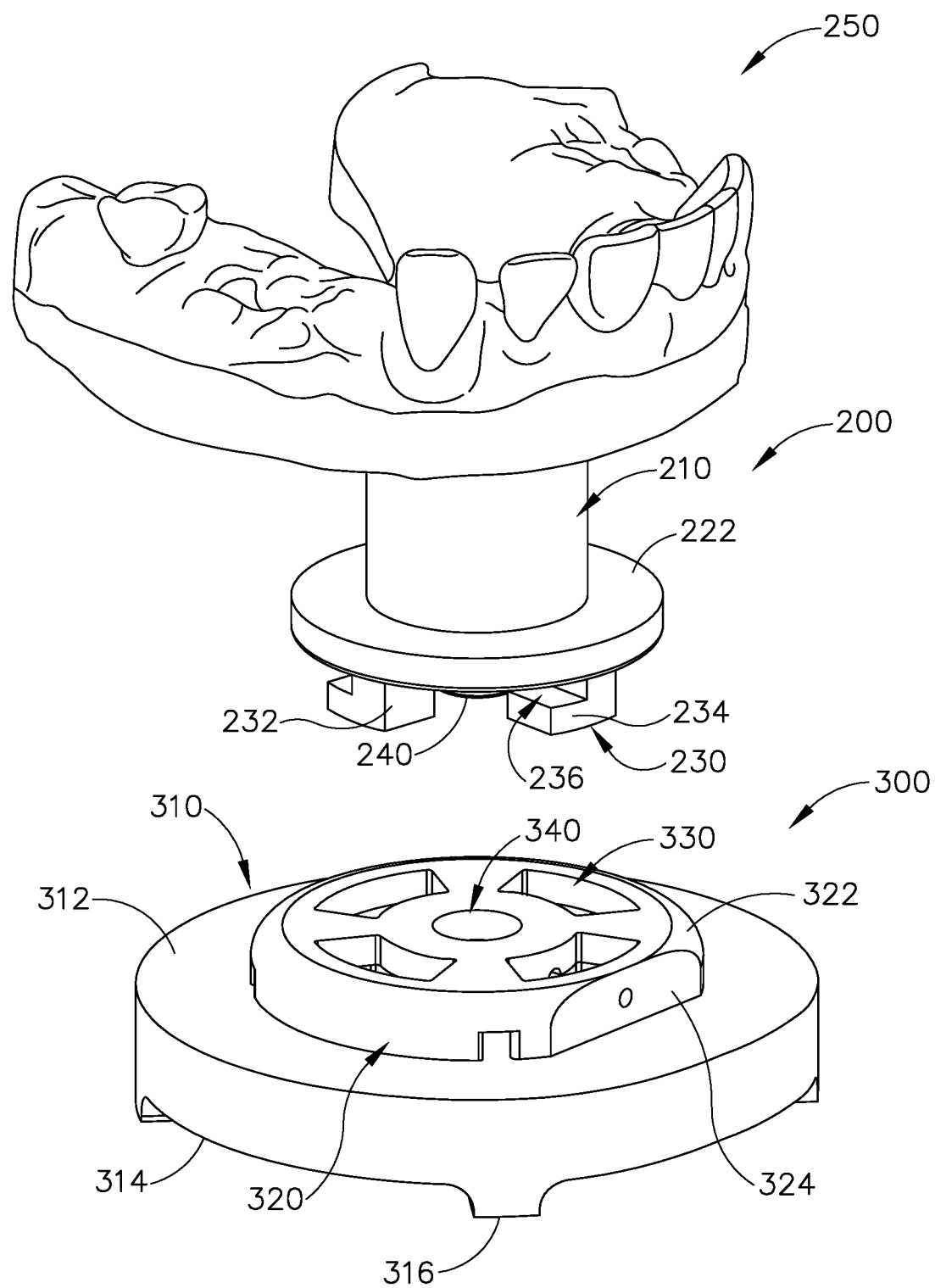
FIG. 19A depicts a perspective view of the working model with integral adapter of FIG. 10 separated from the base plate adapter of FIG. 14.
Figure 19B:
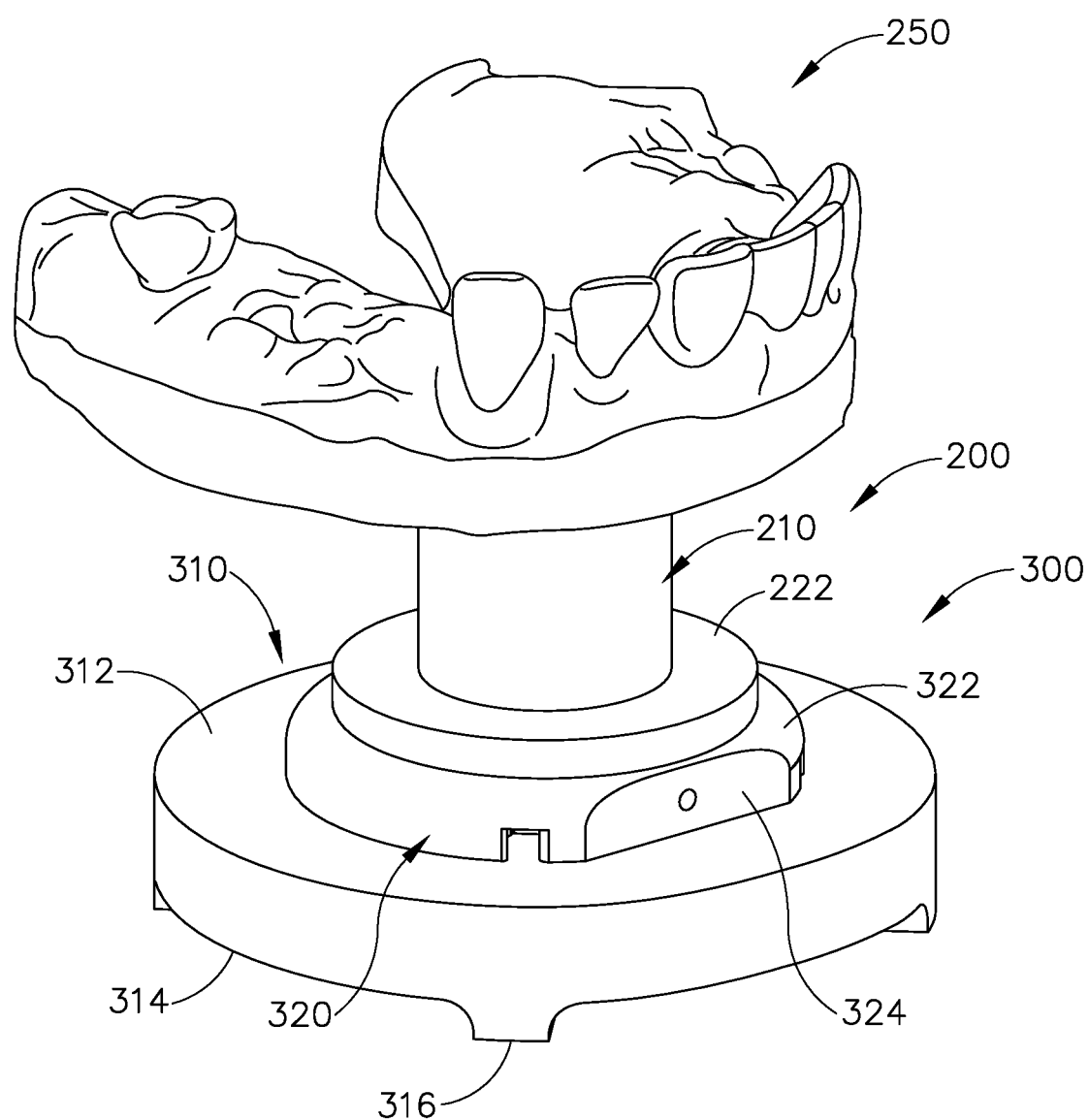
FIG. 19B depicts a perspective view of the working model with integral adapter of FIG. 10 coupled with the base plate adapter of FIG. 14.
Figure 20:
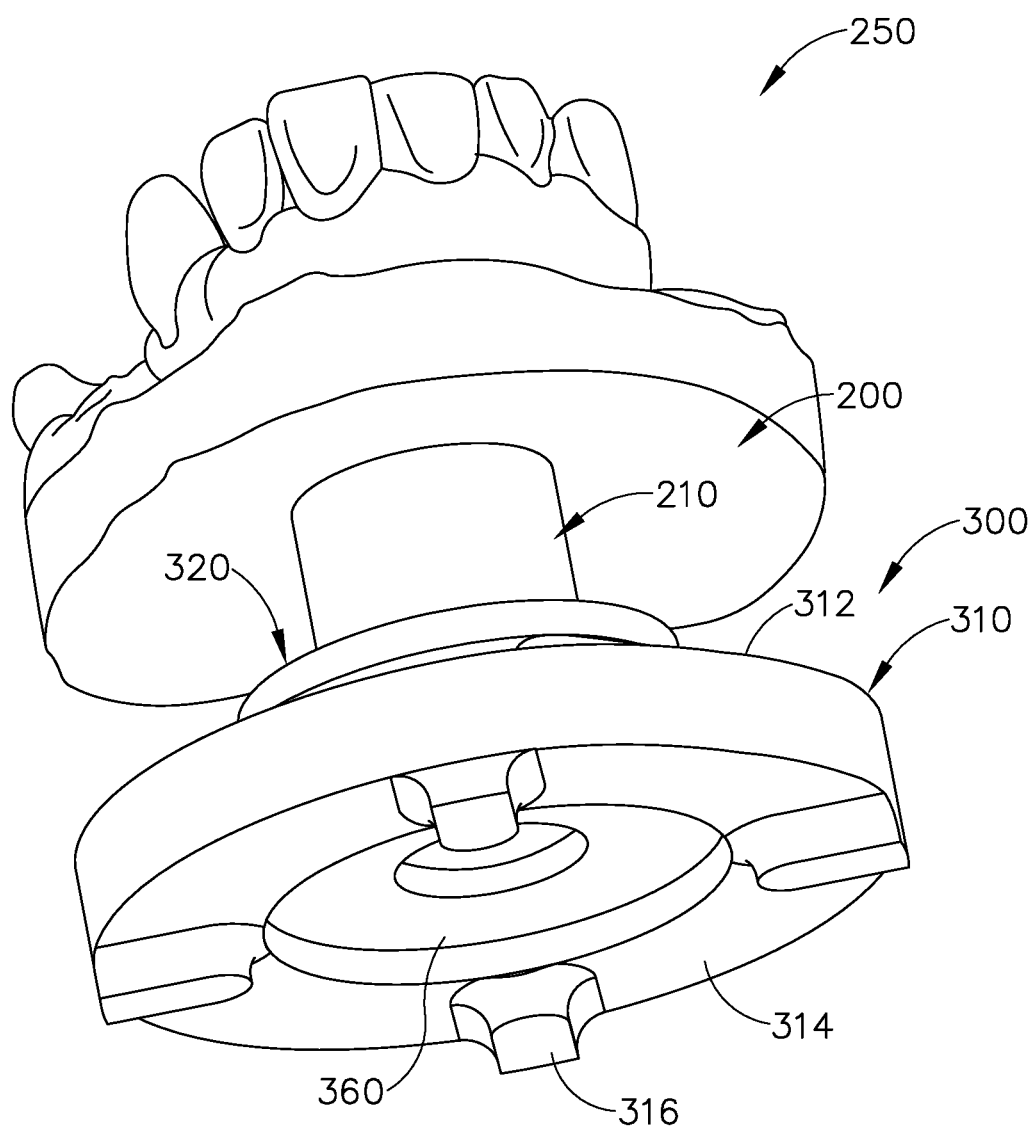
FIG. 20 depicts another perspective view of the working model with integral adapter of FIG. 10 coupled with the base plate adapter of FIG. 14.
Figure 21:
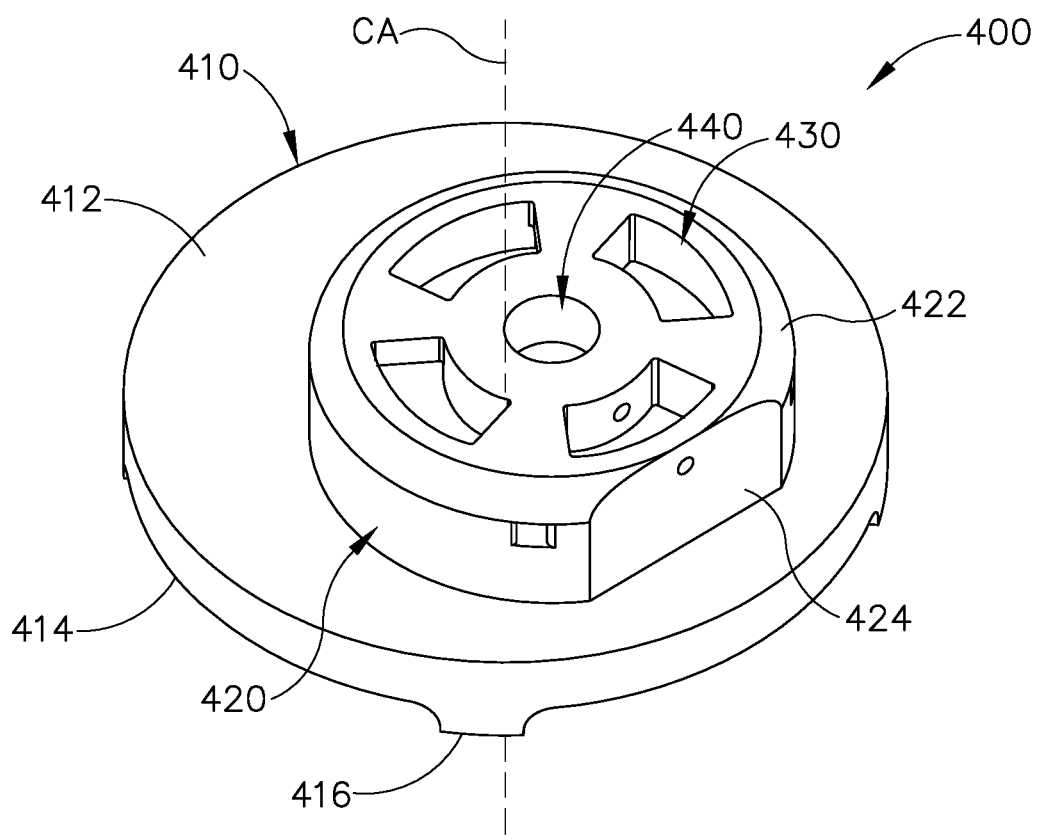
FIG. 21 depicts a first perspective view of another exemplary base plate adapter.

FIGS. 19A-19B show a sequence through which unit (200) may be coupled with base plate adapter (300). As shown in FIG. 19A, the operator positions unit (200) over base plate adapter (300), such that centering pin (240) is coaxially positioned over centering pin recess (340); and such that bayonet prongs (230) are positioned over corresponding bayonet recesses (330). The operator also orients unit (200) such that the front side of dental model (250) is generally aligned with chordal cutout (324), to thereby ensure appropriate angular alignment between unit (200) and base plate adapter (300). The operator then brings unit (200) and base plate adapter (300) together, such that centering pin (240) is received in centering pin recess (340); and such that bayonet prongs (230) are received in bayonet prong recesses (330). The operator then slightly rotates unit (200) relative to base plate adapter (300), to thereby position laterally projecting portions (234) of bayonet prongs (230) in corresponding circumferentially extending portions (334) of bayonet prong recesses (330); and to position shelf portions (336) in corresponding gaps (236) of bayonet prongs (230). In versions where laterally projecting portions (234) and shelf portions (336) have complementary detent features, such detent features may thus be engaged with each other. At this stage, unit (200) and base plate adapter (300) are fully coupled together, as shown in FIGS. 19B and 20. The operator may then secure base plate adapter (300) to a selected base plate (30, 50) of the first articulator device (10), thereby securing unit (200) to the first articulator device (10).

If the operator wishes to secure unit (200) to another kind of articulator device (10), the operator may simply decouple base plate adapter (300) from the selected base plate (30, 50), then decouple unit (200) from base plate adapter (300) by reversing the steps described above. In versions where laterally projecting portions (234) and shelf portions (336) have complementary detent features, such detent features may thus disengage from each other. The operator may then secure unit (200) to another selected base plate adapter (400, 500, 600) using the same kind of procedure as described above; then secure the selected base plate adapter (400, 500, 600) to the particular kind of articulator device (10) associated with that selected base plate adapter (400, 500, 600).

While FIGS. 19A-20 show unit (200) coupled with base plate adapter (300), it should be understood that unit (160) may be coupled with base plate adapter (300) in exactly the same fashion, with bayonet prongs (130) being received in bayonet recesses (330); and with centering pin (140) being received in centering pin recess (340).

B. Second Exemplary Base Plate Adapter

FIGS. 21-25 show another example of a base plate adapter (400) that may be removably coupled with a selected base plate (50, 60). As noted above, the base plates (50, 60) of a given articulator device (10) may be configured identically to each other, such that base plate adapter (400) may be selectively coupled with either upper base plate (50) or lower base plate (60). Base plate adapter (400) of this example includes a base portion (410) and a coupling portion (420). Base portion (410) is generally circular in this example, with a central axis (CA) passing through the center of the circular shape formed by base portion (410). Base portion (410) includes a first side (412) and a second side (414). In comparison to base portion (310) of base plate adapter (300), base portion (410) of the present example has less vertical thickness between sides (412, 414) than the vertical thickness between sides (312, 314) of base portion (310) of base plate adapter (300).

Figure 22:
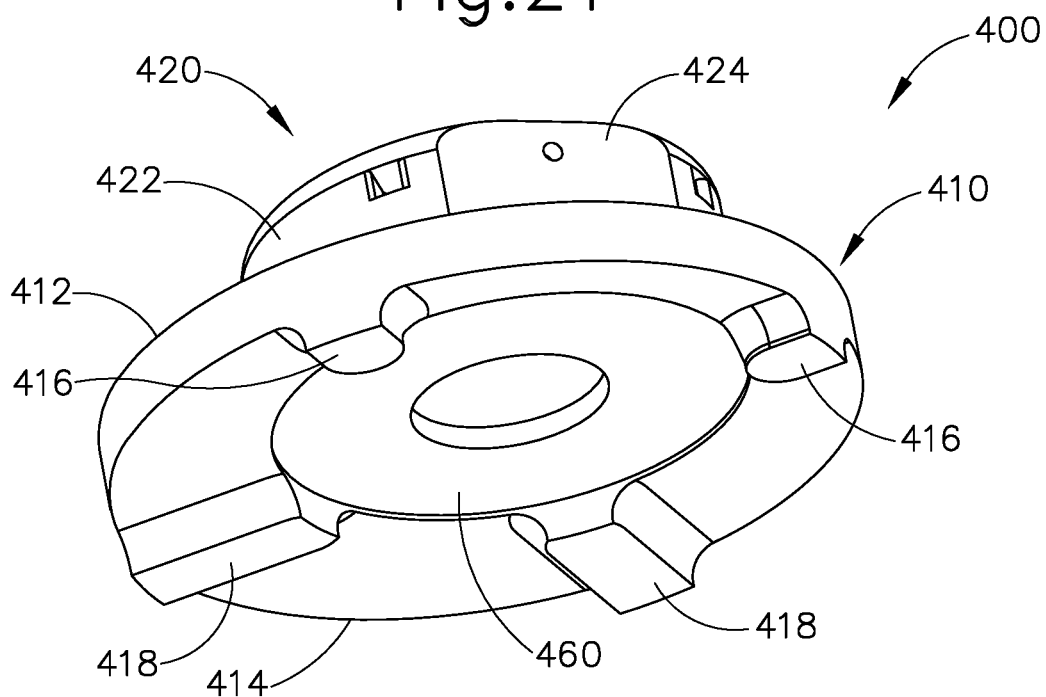
FIG. 22 depicts a second perspective view of the base plate adapter of FIG. 21.
Figure 24:
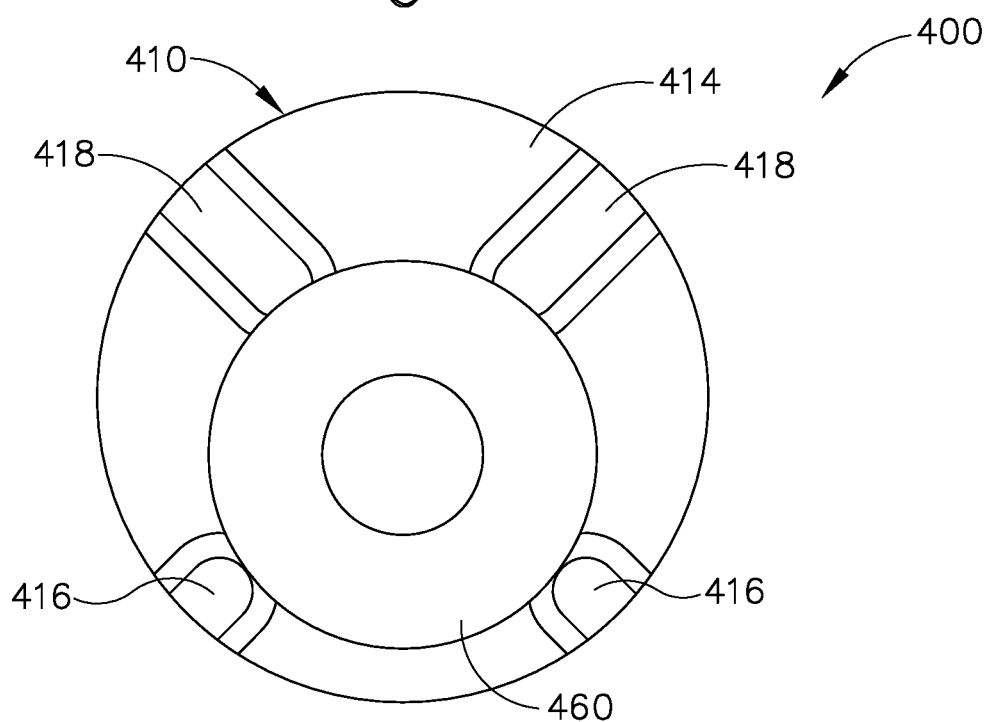
FIG. 24 depicts a second plan view of the base plate adapter of FIG. 21.

As best seen in FIGS. 22 and 24, a first set of protrusions (416) and a second set of protrusions (418) extend from second side (414). Protrusions (416, 418) are equiangularly spaced apart from each other and extend along respective radial paths from the central axis (CA). In the present example, protrusions (418) extend along a radial extent that is longer than the radial extent to which protrusions (416) extend. While four protrusions (416, 418) are shown, any other suitable number of protrusions (416, 418) may be provided in any other arrangement. In this example, the size, spacing, and other configurational aspects of protrusions (416, 418) are configured to complement recesses of base plates (50, 60) of a second particular kind of articulator device (10). Protrusions (416, 418) thus ensure that base plate adapter (400) will seat properly on a selected base plate (50, 60) of the second particular kind of articulator device (10), including being oriented at an appropriate angular position on the selected base plate (50, 60).

Figure 25:
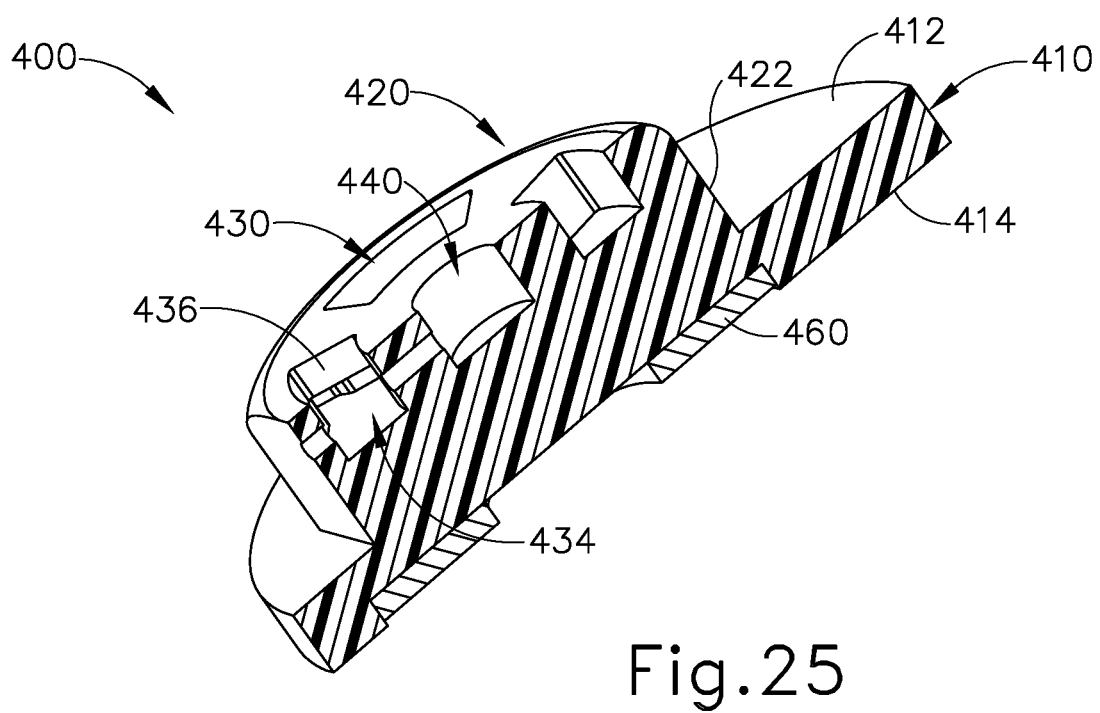
FIG. 25 depicts a cross-sectional view of the base plate adapter of FIG. 21, the cross-section taken along line 25-25 of FIG. 23.
Figure 26:
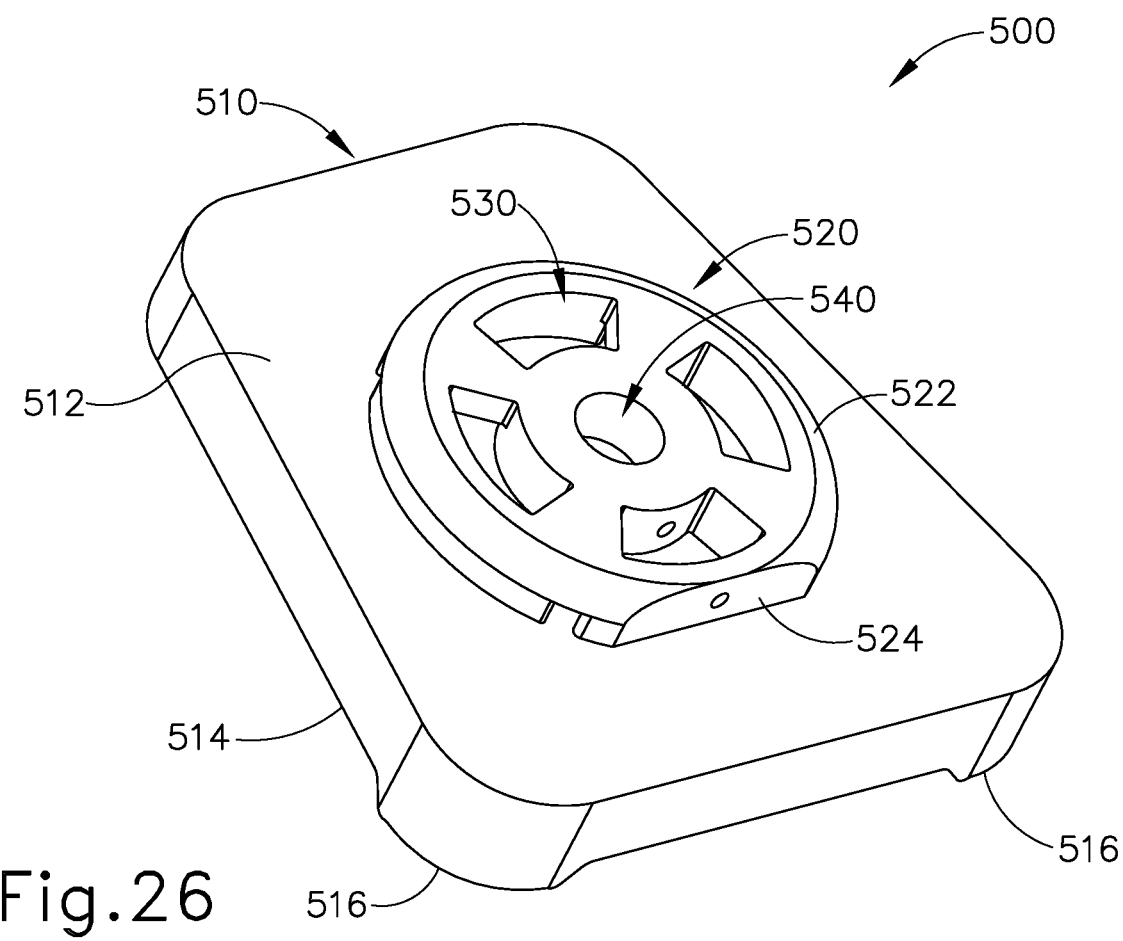
FIG. 26 depicts a first perspective view of another exemplary base plate adapter.

As shown in FIGS. 22 and 24-25, an annular member (460) is also incorporated into base plate adapter (400), adjacent to second side (414). In some versions, annular member (460) is formed of ferrous material, such as steel. In such versions, annular member (460) may cooperate with a magnet that is integrated into base plate (50, 60), to thereby enable base plate adapter (400) to be removably secured to base plate (50, 60) through magnetic attraction. In some other versions, annular member (460) is itself magnetic. In some such versions, base plate (50, 60) includes a ferrous material, but not necessarily a magnet, to enable base plate adapter (400) to be removably secured to base plate (50, 60) through magnetic attraction.

Coupling portion (420) is positioned on first side (412) of base portion (410). Coupling portion (420) of the present example includes a disc-shaped body (422), an array of bayonet recesses (430) formed in body (422), and a centering pin recess (440) formed in body (422). In comparison to body (322) of base plate adapter (300), body (422) of the present example has more vertical thickness than the vertical thickness of body (322) of base plate adapter (300). Also unlike body (322) of base plate adapter (300), body (422) is offset from central axis (CA) of base portion (410) in this example. Body (422) also includes a chordal cutout (424), thereby providing a laterally flat region along body (422).

Figure 23:
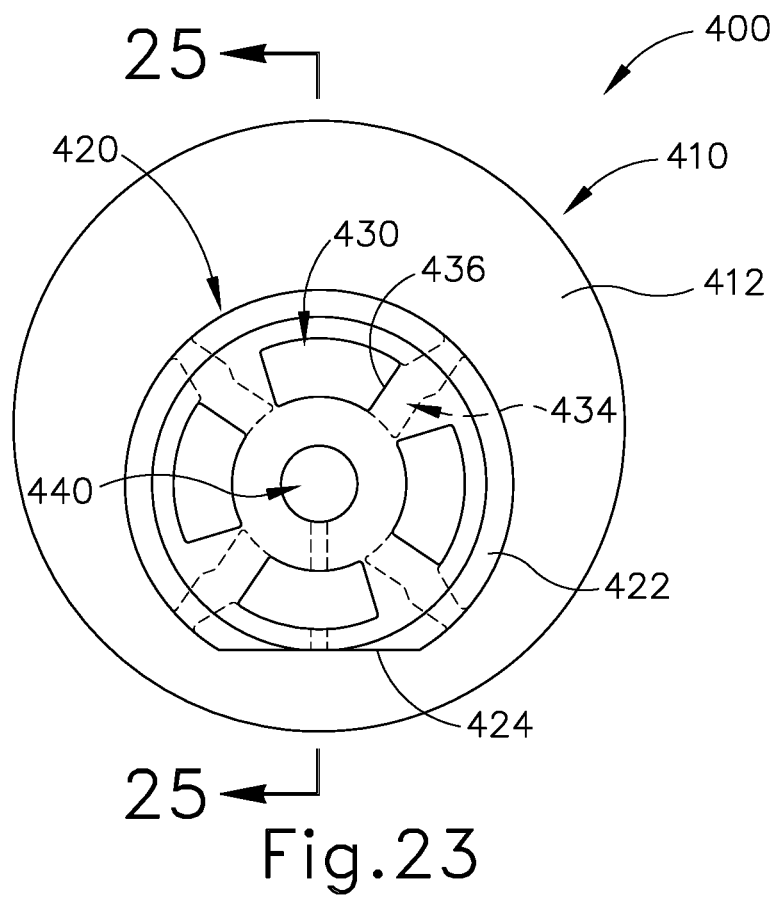
FIG. 23 depicts a first plan view of the base plate adapter of FIG. 21.

As best seen in FIGS. 23 and 25, each bayonet recess (430) includes a circumferentially extending portion (434) positioned under a shelf portion (436). Each circumferentially extending portion (434) is sized and configured to receive a corresponding laterally projecting portion (134, 234) of bayonet prong (130, 230), with each shelf portion (436) being received in a corresponding gap (136, 236) of bayonet prong (130, 230). In some versions, shelf portion (436) includes a detent feature on the side of shelf portion (436) facing circumferentially extending portion (434) of bayonet recess (430). Such a detent feature may be configured to complement the detent feature of laterally projecting portion (134, 234) described above, such that the detent features may cooperate to selectively secure dental model adapter (100, 200) with base plate adapter (400). The detent feature of shelf portion (436) may take the form of a rounded protrusion, a rounded recess, a tab, or some other kind of detent feature as will be apparent to those skilled in the art in view of the teachings herein.

Bayonet recesses (430) are equiangularly spaced from each other in a generally annular array in the present example, though it should be understood that any other suitable spacing may be used. Similarly, while four bayonet recesses (430) are provided in the present example, any other suitable number of bayonet recesses (430) may be provided. In the present example, any variation in the configuration and arrangement of bayonet recesses (430) should correspond with variations in the configuration and arrangement of bayonet prongs (130, 230).

Centering pin recess (440) is coaxially centered about the central axis of body (422); and about the central axis of the annular array of bayonet recesses (430); yet is offset from the central axis (CA) of base portion (410). Alternatively, centering pin recess (440) may be located at any other suitable position. In the present example, any variation in the configuration and positioning of centering pin recess (440) should correspond with variations in the configuration and arrangement of centering pin (140, 240).

The process for coupling either unit (160, 200) with base plate adapter (400), and subsequently decoupling unit (160, 200) from base plate adapter (400), would be the same as such processes described above in relation to base plate adapter (300). Thus, centering pin recess (440) may receive centering pin (140, 240) and bayonet recesses (430) may receive bayonet prongs (130, 230). Detent features of laterally projecting portions (134, 234) may engage complementary detent features of shelf portions (436). It should be understood that base plate adapter (400) will enable an operator to readily couple either unit (160, 200) with the second kind of articulator device (10). Thus, the operator may selectively couple unit (160, 200) with base plate adapter (300) to couple unit (160, 200) with the first kind of articulator device (10); or couple unit (160, 200) with base plate adapter (400) to couple unit (160, 200) with the second kind of articulator device (10).

C. Third Exemplary Base Plate Adapter

FIGS. 26-30 show another example of a base plate adapter (500) that may be removably coupled with a selected base plate (50, 60). As noted above, the base plates (50, 60) of a given articulator device (10) may be configured identically to each other, such that base plate adapter (500) may be selectively coupled with either upper base plate (50) or lower base plate (60). Base plate adapter (500) of this example includes a base portion (510) and a coupling portion (520). Base portion (510) is generally trapezoidal in this example. Base portion (510) includes a first side (512) and a second side (514).

Figure 27:
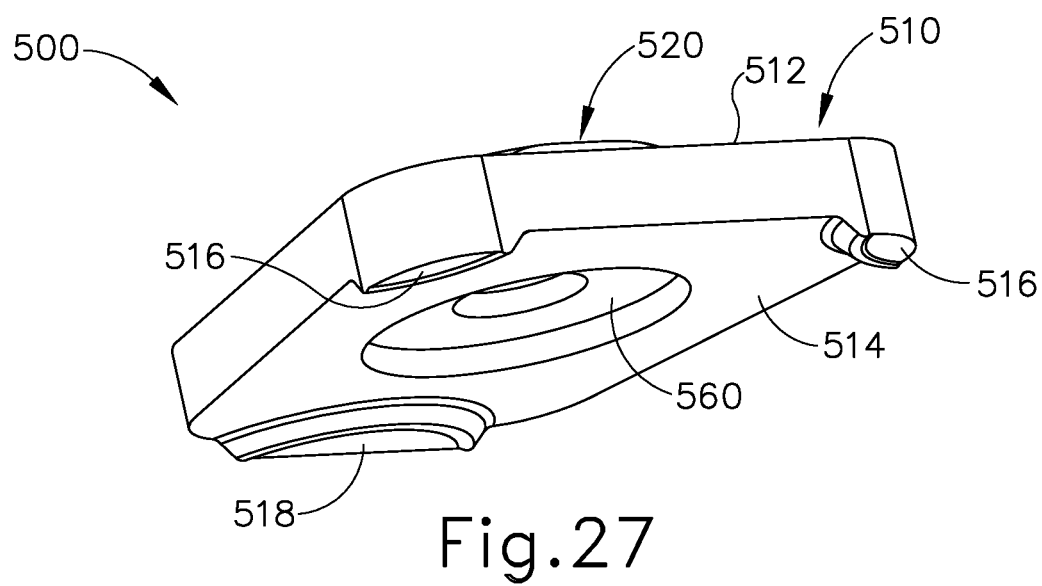
FIG. 27 depicts a second perspective view of the base plate adapter of FIG. 26.
Figure 29:
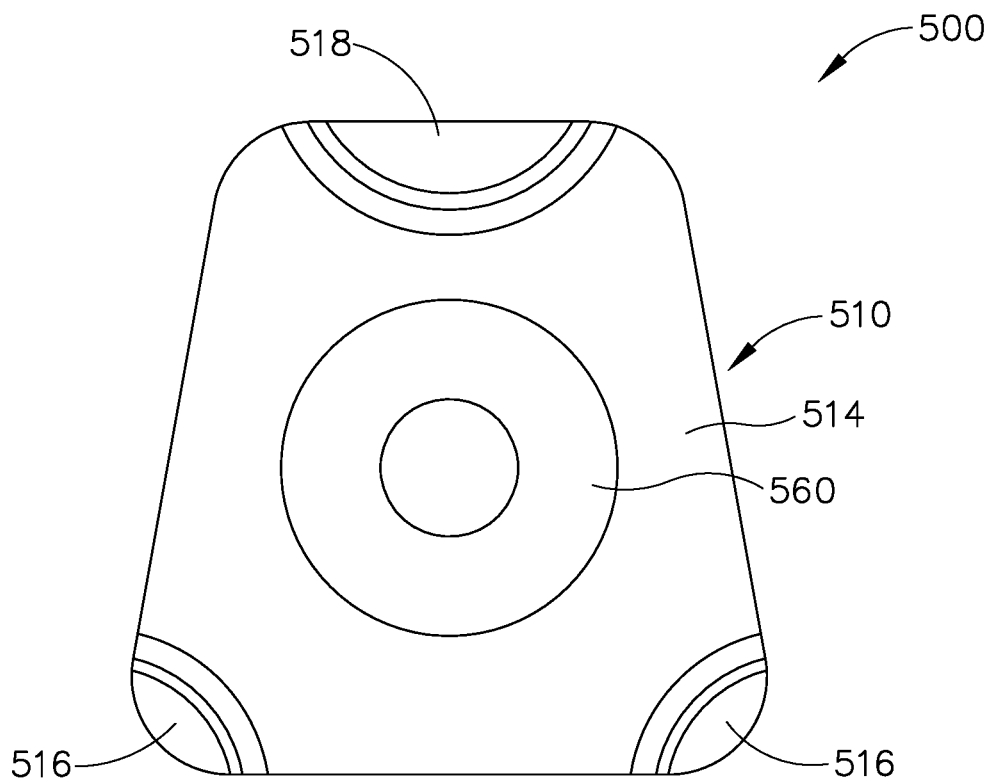
FIG. 29 depicts a second plan view of the base plate adapter of FIG. 26.

As best seen in FIGS. 27 and 29, a first set of protrusions (516) and a second protrusion (518) extend from second side (514). Protrusions (516) are positioned at the corners between the three longest sides of the trapezoid shape defined by base portion (510); while protrusion (518) is positioned along the shortest side of the trapezoid shape defined by base portion. While three protrusions (516, 518) are shown, any other suitable number of protrusions (516, 518) may be provided in any other arrangement. In this example, the size, spacing, and other configurational aspects of protrusions (516, 518) are configured to complement recesses of base plates (50, 60) of a third particular kind of articulator device (10). Protrusions (516, 518) thus ensure that base plate adapter (500) will seat properly on a selected base plate (50, 60) of the third particular kind of articulator device (10), including being oriented at an appropriate angular position on the selected base plate (50, 60).

Figure 30:
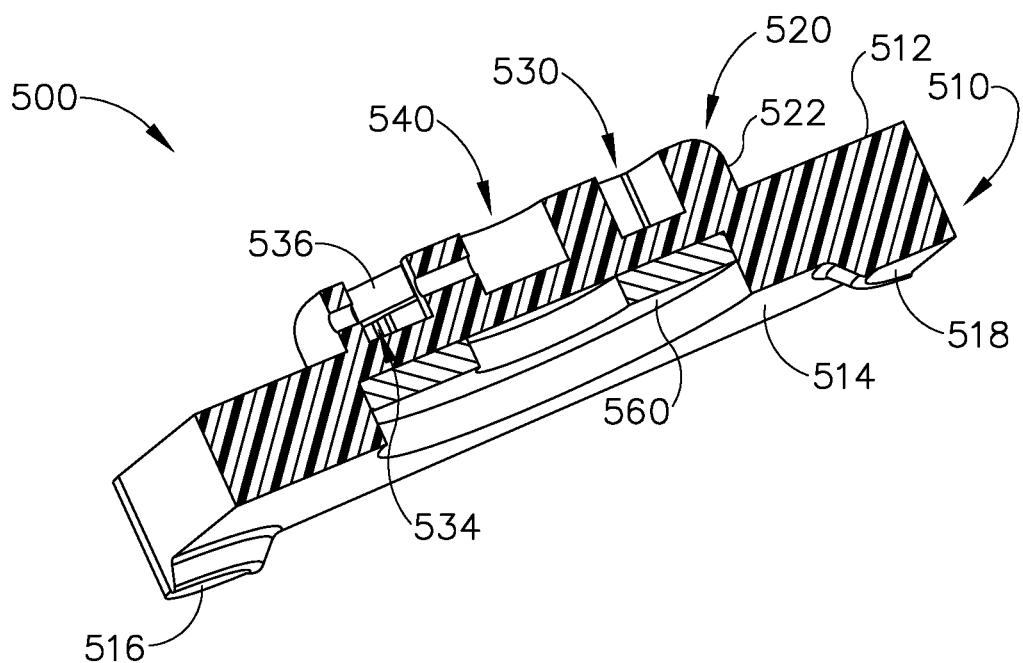
FIG. 30 depicts a cross-sectional view of the base plate adapter of FIG. 26, the cross-section taken along line 25-25 of FIG. 28.
Figure 31:
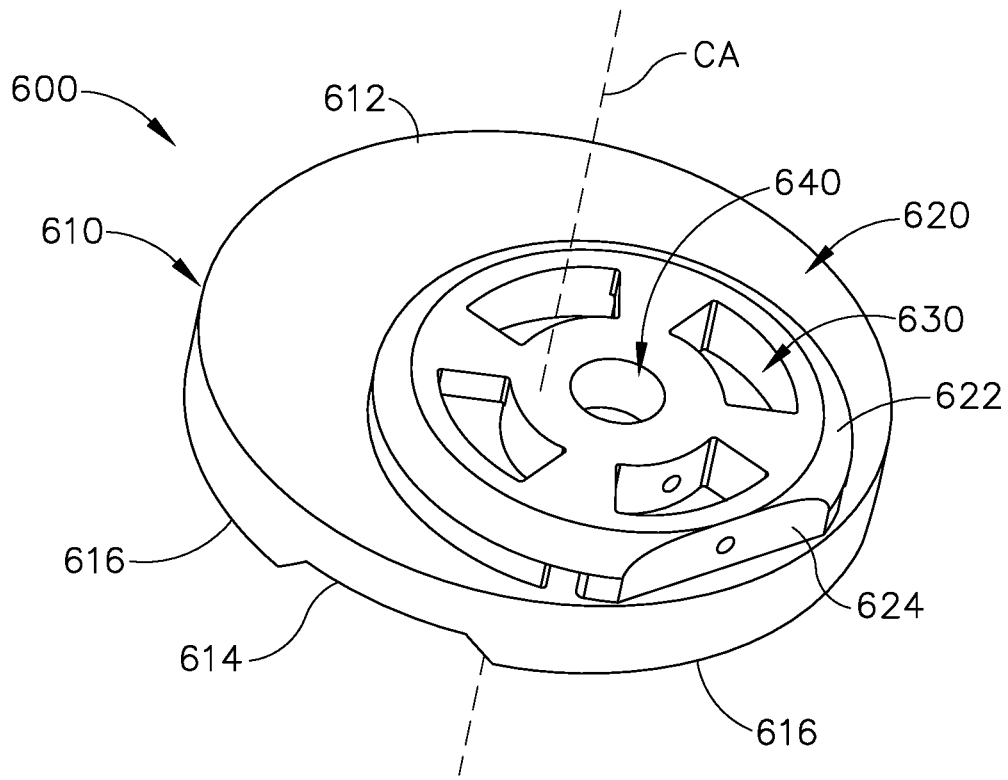
FIG. 31 depicts a first perspective view of another exemplary base plate adapter.

As shown in FIGS. 27 and 29-30, an annular member (560) is also incorporated into base plate adapter (500), adjacent to second side (514). In some versions, annular member (560) is formed of ferrous material, such as steel. In such versions, annular member (560) may cooperate with a magnet that is integrated into base plate (50, 60), to thereby enable base plate adapter (500) to be removably secured to base plate (50, 60) through magnetic attraction. In some other versions, annular member (560) is itself magnetic. In some such versions, base plate (50, 60) includes a ferrous material, but not necessarily a magnet, to enable base plate adapter (500) to be removably secured to base plate (50, 60) through magnetic attraction.

Coupling portion (520) is positioned on first side (512) of base portion (510). Coupling portion (520) of the present example includes a disc-shaped body (522), an array of bayonet recesses (530) formed in body (522), and a centering pin recess (540) formed in body (522). Body (522) also includes a chordal cutout (524), thereby providing a laterally flat region along body (522).

Figure 28:
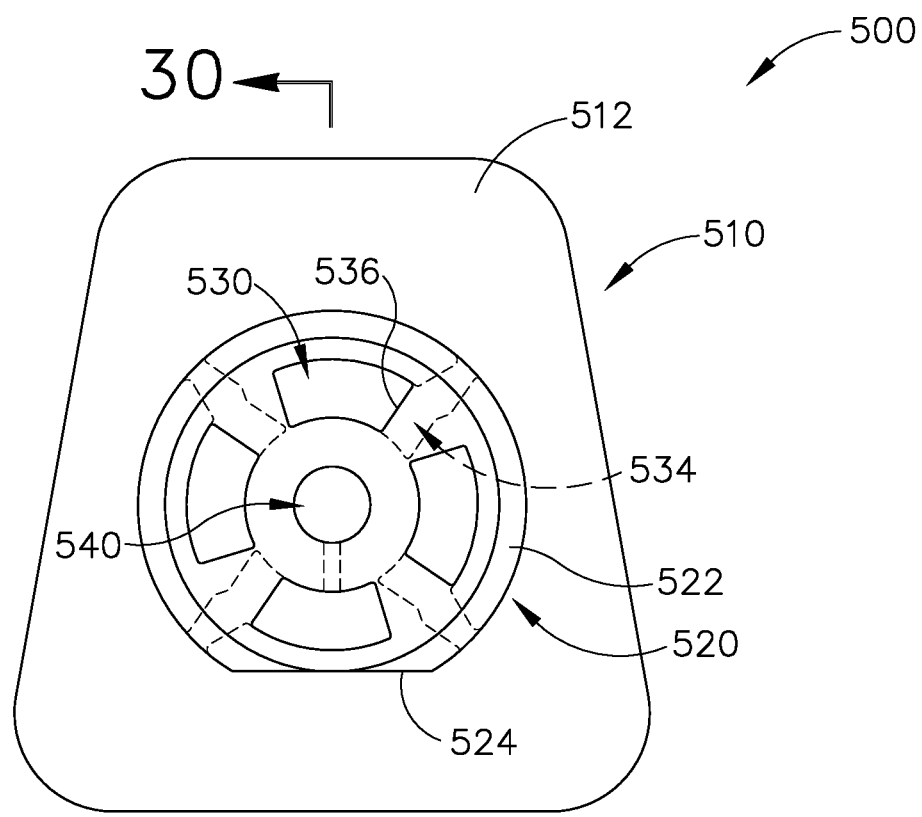
FIG. 28 depicts a first plan view of the base plate adapter of FIG. 26.

As best seen in FIGS. 28 and 30, each bayonet recess (530) includes a circumferentially extending portion (534) positioned under a shelf portion (536). Each circumferentially extending portion (534) is sized and configured to receive a corresponding laterally projecting portion (134, 234) of bayonet prong (130, 230), with each shelf portion (536) being received in a corresponding gap (136, 236) of bayonet prong (130, 230). In some versions, shelf portion (536) includes a detent feature on the side of shelf portion (536) facing circumferentially extending portion (534) of bayonet recess (530). Such a detent feature may be configured to complement the detent feature of laterally projecting portion (134, 234) described above, such that the detent features may cooperate to selectively secure dental model adapter (100, 200) with base plate adapter (500). The detent feature of shelf portion (536) may take the form of a rounded protrusion, a rounded recess, a tab, or some other kind of detent feature as will be apparent to those skilled in the art in view of the teachings herein.

Bayonet recesses (530) are equiangularly spaced from each other in a generally annular array in the present example, though it should be understood that any other suitable spacing may be used. Similarly, while four bayonet recesses (530) are provided in the present example, any other suitable number of bayonet recesses (530) may be provided. In the present example, any variation in the configuration and arrangement of bayonet recesses (530) should correspond with variations in the configuration and arrangement of bayonet prongs (130, 230).

Centering pin recess (540) is coaxially centered about the central axis of body (522); and about the central axis of the annular array of bayonet recesses (530). Alternatively, centering pin recess (540) may be located at any other suitable position. In the present example, any variation in the configuration and positioning of centering pin recess (540) should correspond with variations in the configuration and arrangement of centering pin (140, 240).

The process for coupling either unit (160, 200) with base plate adapter (500), and subsequently decoupling unit (160, 200) from base plate adapter (500), would be the same as such processes described above in relation to base plate adapter (300). Thus, centering pin recess (540) may receive centering pin (140, 240) and bayonet recesses (530) may receive bayonet prongs (130, 230). Detent features of laterally projecting portions (134, 234) may engage complementary detent features of shelf portions (536). It should be understood that base plate adapter (500) will enable an operator to readily couple either unit (160, 200) with the third kind of articulator device (10). Thus, the operator may selectively couple unit (160, 200) with base plate adapter (300) to couple unit (160, 200) with the first kind of articulator device (10); or couple unit (160, 200) with base plate adapter (400) to couple unit (160, 200) with the second kind of articulator device (10); or couple unit (160, 200) with base plate adapter (500) to couple unit (160, 200) with the third kind of articulator device (10).

D. Fourth Exemplary Base Plate Adapter

FIGS. 31-35 show another example of a base plate adapter (600) that may be removably coupled with a selected base plate (50, 60). As noted above, the base plates (50, 60) of a given articulator device (10) may be configured identically to each other, such that base plate adapter (600) may be selectively coupled with either upper base plate (50) or lower base plate (60). Base plate adapter (600) of this example includes a base portion (610) and a coupling portion (620). Base portion (610) is generally circular in this example, with a central axis (CA) passing through the center of the circular shape formed by base portion (610). Base portion (610) includes a first side (612) and a second side (614). In comparison to base portion (310) of base plate adapter (300), base portion (610) of the present example has less vertical thickness between sides (612, 614) than the vertical thickness between sides (312, 314) of base portion (310) of base plate adapter (300).

Figure 32:
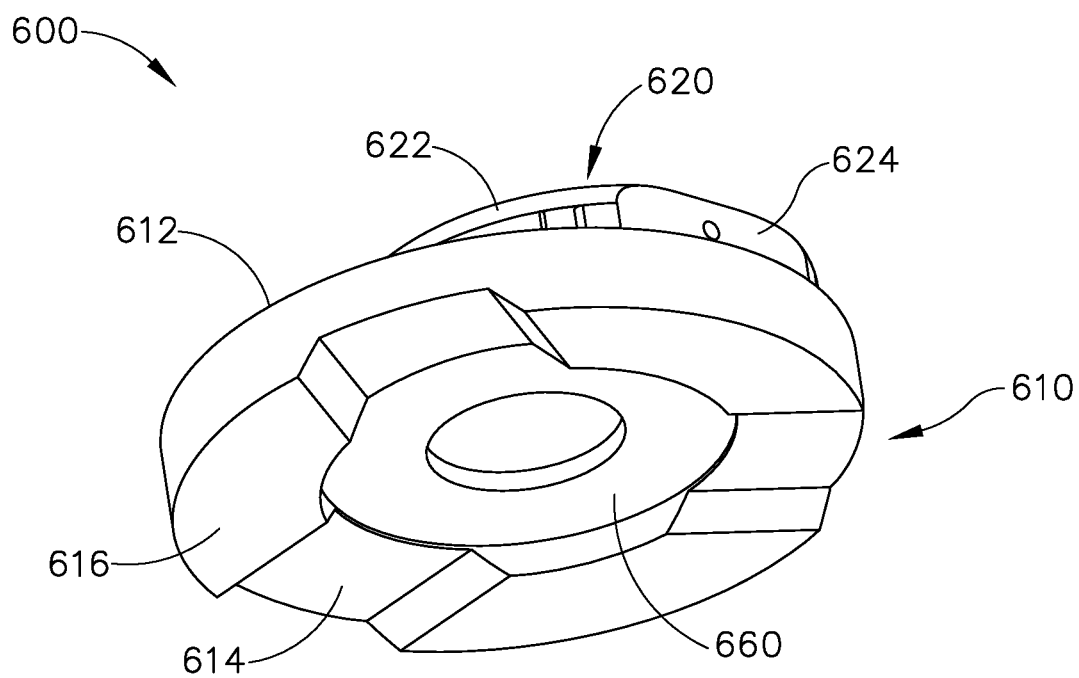
FIG. 32 depicts a second perspective view of the base plate adapter of FIG. 31.
Figure 34:
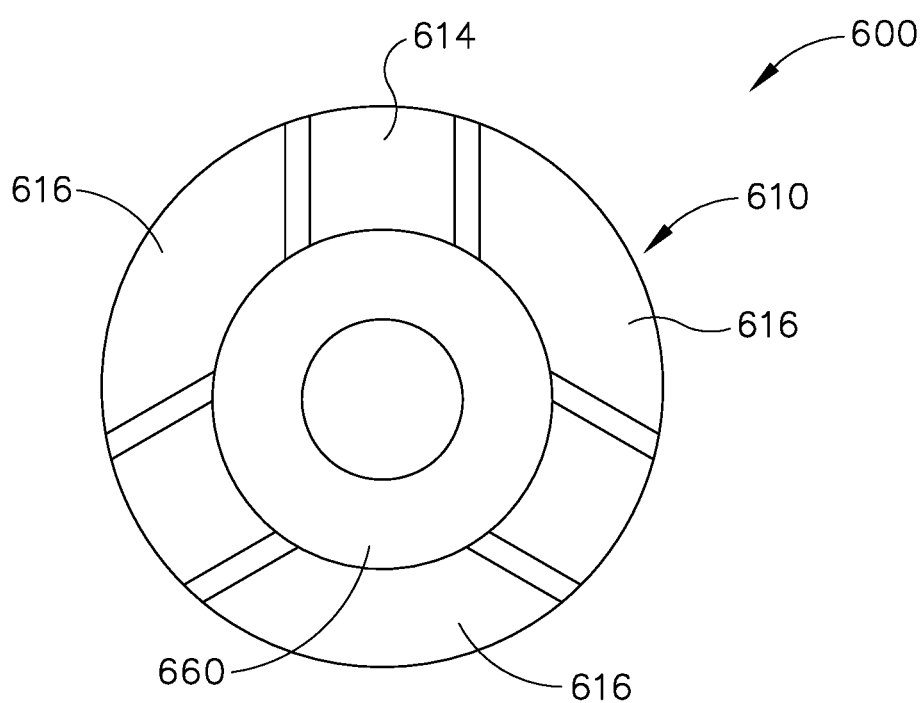
FIG. 34 depicts a second plan view of the base plate adapter of FIG. 31.

As best seen in FIGS. 32 and 34, a set of protrusions (616) extend from second side (614). Protrusions (616) are equiangularly spaced apart from each other and extend along respective radial paths from the central axis (CA). In the present example, each protrusion (616) extends along the same angular and radial extent as the other protrusions (616). While three protrusions (616) are shown, any other suitable number of protrusions (616) may be provided in any other arrangement. In this example, the size, spacing, and other configurational aspects of protrusions (616) are configured to complement recesses of base plates (50, 60) of a fourth particular kind of articulator device (10). Protrusions (616) thus ensure that base plate adapter (600) will seat properly on a selected base plate (50, 60) of the second particular kind of articulator device (10), including being oriented at an appropriate angular position on the selected base plate (50, 60).

Figure 35:
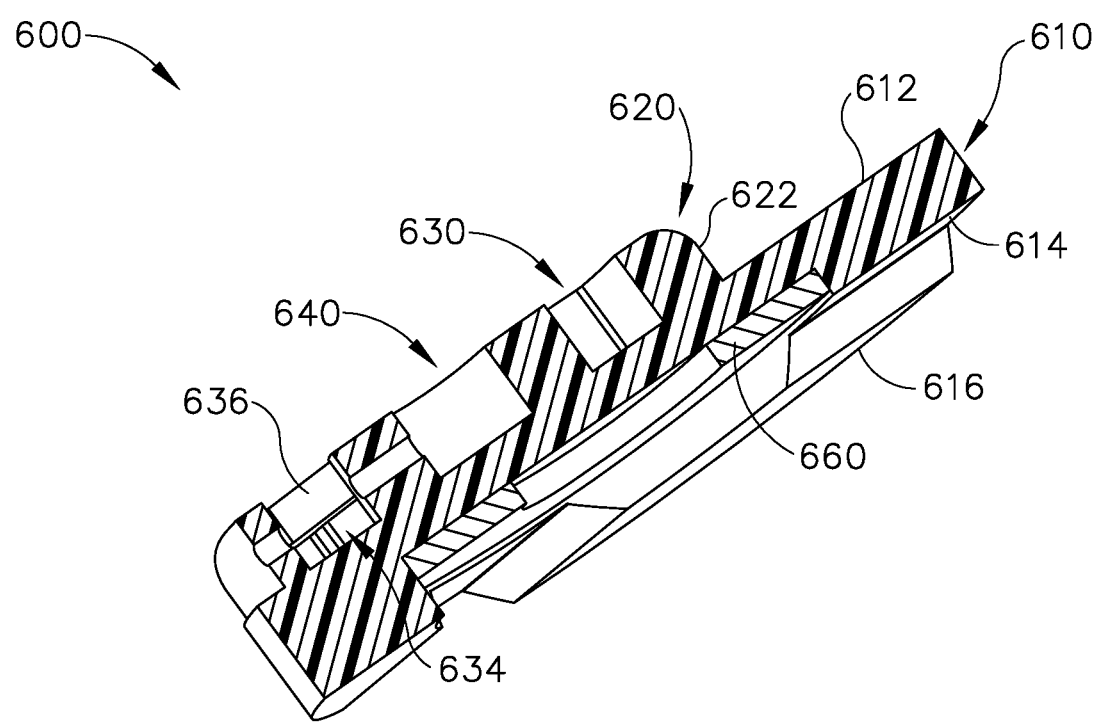
FIG. 35 depicts a cross-sectional view of the base plate adapter of FIG. 31, the cross-section taken along line 35-35 of FIG. 33.

As shown in FIGS. 32 and 34-35, an annular member (660) is also incorporated into base plate adapter (600), adjacent to second side (614). In some versions, annular member (660) is formed of ferrous material, such as steel. In such versions, annular member (660) may cooperate with a magnet that is integrated into base plate (50, 60), to thereby enable base plate adapter (600) to be removably secured to base plate (50, 60) through magnetic attraction. In some other versions, annular member (660) is itself magnetic. In some such versions, base plate (50, 60) includes a ferrous material, but not necessarily a magnet, to enable base plate adapter (600) to be removably secured to base plate (50, 60) through magnetic attraction.

Coupling portion (620) is positioned on first side (612) of base portion (610). Coupling portion (620) of the present example includes a disc-shaped body (622), an array of bayonet recesses (630) formed in body (622), and a centering pin recess (640) formed in body (622). In comparison to body (422) of base plate adapter (400), body (622) of the present example has less vertical thickness than the vertical thickness of body (422) of base plate adapter (400). Like body (422) of base plate adapter (400), body (622) of the present example is offset from central axis (CA) of base portion (610) in this example. However, in the present example, the offset of body (622) from central axis (CA) of base portion (610) is larger than the offset of body (422) from central axis (CA) of base portion (410). Body (622) of the present example also includes a chordal cutout (624), thereby providing a laterally flat region along body (622).

Figure 33:
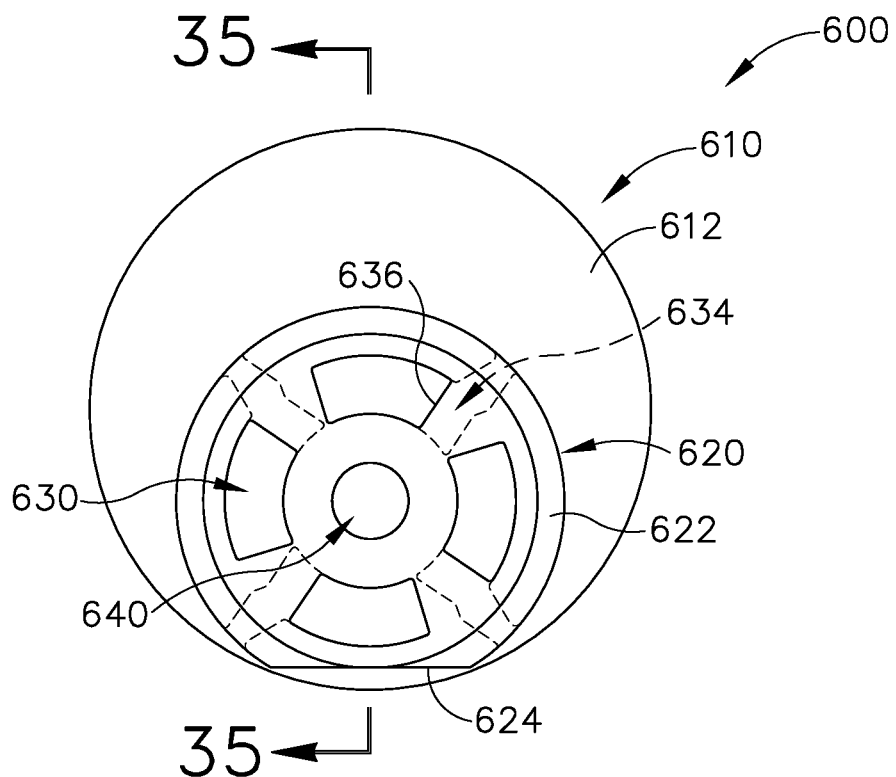
FIG. 33 depicts a first plan view of the base plate adapter of FIG. 31.

As best seen in FIGS. 33 and 35, each bayonet recess (630) includes a circumferentially extending portion (634) positioned under a shelf portion (636). Each circumferentially extending portion (634) is sized and configured to receive a corresponding laterally projecting portion (134, 234) of bayonet prong (130, 230), with each shelf portion (636) being received in a corresponding gap (136, 236) of bayonet prong (130, 230). In some versions, shelf portion (636) includes a detent feature on the side of shelf portion (636) facing circumferentially extending portion (634) of bayonet recess (630). Such a detent feature may be configured to complement the detent feature of laterally projecting portion (134, 234) described above, such that the detent features may cooperate to selectively secure dental model adapter (100, 200) with base plate adapter (600). The detent feature of shelf portion (636) may take the form of a rounded protrusion, a rounded recess, a tab, or some other kind of detent feature as will be apparent to those skilled in the art in view of the teachings herein.

Bayonet recesses (630) are equiangularly spaced from each other in a generally annular array in the present example, though it should be understood that any other suitable spacing may be used. Similarly, while four bayonet recesses (630) are provided in the present example, any other suitable number of bayonet recesses (630) may be provided. In the present example, any variation in the configuration and arrangement of bayonet recesses (630) should correspond with variations in the configuration and arrangement of bayonet prongs (130, 230).

Centering pin recess (640) is coaxially centered about the central axis of body (622); and about the central axis of the annular array of bayonet recesses (630); yet is offset from the central axis (CA) of base portion (610). Alternatively, centering pin recess (640) may be located at any other suitable position. In the present example, any variation in the configuration and positioning of centering pin recess (640) should correspond with variations in the configuration and arrangement of centering pin (140, 240).

The process for coupling either unit (160, 200) with base plate adapter (600), and subsequently decoupling unit (160, 200) from base plate adapter (600), would be the same as such processes described above in relation to base plate adapter (300). Thus, centering pin recess (640) may receive centering pin (140, 240) and bayonet recesses (630) may receive bayonet prongs (130, 230). Detent features of laterally projecting portions (134, 234) may engage complementary detent features of shelf portions (636). It should be understood that base plate adapter (600) will enable an operator to readily couple either unit (160, 200) with the fourth kind of articulator device (10). Thus, the operator may selectively couple unit (160, 200) with base plate adapter (300) to couple unit (160, 200) with the first kind of articulator device (10); or couple unit (160, 200) with base plate adapter (400) to couple unit (160, 200) with the second kind of articulator device (10); or couple unit (160, 200) with base plate adapter (500) to couple unit (160, 200) with the third kind of articulator device (10); or couple unit (160,

200) with base plate adapter (600) to couple unit (160, 200) with the fourth kind of articulator device (10).

It should be understood from the foregoing that the configuration of dental model adapter (100) and base plate adapters (300, 400, 500, 600) will allow complementary models to come together in the same position in various kinds of articulator devices (10). In other words, if a dental model (150) of a patient's upper alveolar arch is secured to one dental model adapter (100) to form un upper unit (160), and a dental model (150) of a patient's lower alveolar arch is secured to one dental model adapter (100) to form a lower unit (160), these two units may be readily transferred between various kinds of articulator devices (10) using the appropriate base plate adapters (300, 400, 500, 600) associated with the particular articulator device (10) at hand. When the dental models (150) are brought into contact with each other through manipulation of one articulator device (10), the dental models (150) will contact each other in the same position when they are brought into contact with each other through manipulation of another articulator device (10), due to the adaptive configurations of dental model adapter (100) and base plate adapters (300, 400, 500, 600). The same results may be achieved using units (200) with base plate adapters (300, 400, 500, 600).

IV. MISCELLANEOUS

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those skilled in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:
1. An apparatus, comprising:
   (a) a dental model coupling portion, the dental model coupling portion being configured to couple with a dental model; and
   (b) a base plate adapter coupling portion, the base plate adapter coupling portion including:
      (i) a body fixedly secured relative to the dental model coupling portion,
      (ii) a centering pin extending from the body, and
      (iii) a set of bayonet prongs extending from the body, the set of bayonet prongs being positioned inwardly from an outer perimeter of the body and radially around the centering pin, wherein each bayonet prong of the set of bayonet prongs is angularly separated around the centering pin from the other bayonet prongs of the set of bayonet prongs and configured to removably vertically secure the base plate adapter coupling portion to a base plate adapter of a dental model articulator.

2. The apparatus of claim 1, the dental model coupling portion including a plate configured to couple with the dental model.

3. The apparatus of claim 2, the plate including a plurality of openings configured for fixation of the dental model to the plate.

4. The apparatus of claim 3, at least some of the openings having a square configuration.

5. The apparatus of claim 2, the plate defining a grid configuration.

6. The apparatus of claim 1, further comprising a dental model fixedly secured to the dental model coupling portion, the dental model including a three-dimensional representation of a patient's dentition.

7. The apparatus of claim 1, the dental model coupling portion including a post configured to extend between the base plate adapter coupling and a dental model.

8. The apparatus of claim 7, further comprising a dental model integrally formed with the post, the dental model including a three-dimensional representation of a patient's dentition.

9. The apparatus of claim 1, each bayonet prong including:
   (A) a vertically projecting portion projecting vertically from the base plate adapter coupling portion, and
   (B) a laterally projecting portion projecting laterally from the vertically projecting portion.

10. The apparatus of claim 9, each bayonet prong defining a gap between the laterally projecting portion and the base plate adapter coupling portion.

11. The apparatus of claim 1, further comprising a base plate adapter, the base plate adapter including:
   (i) a first side configured to removably couple with the base plate adapter coupling portion, and
   (ii) a second side opposite the first side, the second side being configured to removably couple with a dental model articulator.

12. The apparatus of claim 11, the base plate adapter further including a ferromagnetic member configured to provide removable coupling between the base plate adapter and the dental model articulator through magnetic attraction.

13. The apparatus of claim 11, the first side including a plurality of recesses configured to receive the set of bayonet prongs of the base plate adapter coupling portion.

14. The apparatus of claim 13, the recesses and the set of bayonet prongs being configured to provide a bayonet coupling.

15. The apparatus of claim 11, the second side including one or more protrusions, the one or more protrusions of the second side being configured to complement features of a dental model articulator to thereby provide angular alignment between the base plate adapter and the dental model articulator.

16. The apparatus of claim 11, the base plate adapter further including:
 (i) a first body presenting the first side, the first body defining a first central axis, and
 (ii) a second body presenting the second side, the second body defining a second central axis, the second central axis being parallel with the first central axis, the first central axis being offset from the second central axis.

17. An apparatus comprising:
(a) a dental model adapter, the dental model adapter including:
 (i) a dental model coupling portion, the dental model coupling portion being configured to couple with a dental model, and
 (ii) a base plate adapter coupling portion, the base plate adapter coupling portion including:
  (A) a body fixedly secured relative to the dental model coupling portion,
  (B) a centering pin extending from the body, and
  (C) a set of bayonet prongs extending from the body, the set of bayonet prongs being positioned radially around the centering pin, wherein each bayonet prong of the set of bayonet prongs is angularly separated around the centering pin from the other bayonet prongs of the set of bayonet prongs; and
(b) a base plate adapter, the base plate adapter including:
 (i) a first side including a centering pin recess configured to concentrically receive the centering pin,
 (ii) a set of bayonet recesses positioned inwardly from an outer perimeter of the first side and radially around the centering pin recess, the bayonet recesses being configured to rotatably receive the bayonet prongs to thereby removably couple the base plate adapter with the dental model adapter, and
 (iii) a second side opposite the first side, the second side being configured to removably couple with a dental model articulator.

18. A kit, comprising:
(a) a dental model adapter, the dental model adapter including:
 (i) a dental model coupling portion, the dental model coupling portion being configured to couple with a dental model, and
 (ii) a base plate adapter coupling portion, the base plate adapter coupling portion including:
  (A) a body fixedly secured relative to the dental model coupling portion, and
  (B) a set of bayonet prongs extending from the body; and
(b) a plurality of base plate adapters, each base plate adapter including:
 (i) a first side including a set of bayonet recesses, the bayonet recesses being configured to receive the bayonet prongs to thereby removably couple the base plate adapter with the dental model adapter, and
 (ii) a second side opposite the first side, the second side being configured to removably couple with a dental model articulator, the bayonet recesses on the first side of each base plate adapter being configured identically to the bayonet recesses on the first side of the other base plate adapters such that the bayonet recesses on the first side of each base plate adapter are configured to couple with the bayonet prongs of the base plate adapter coupling portion, the second side of each base plate adapter being configured differently from the second side of the other base plate adapters to thereby complement different kinds of dental model articulators.

\* \* \* \* \*